US006950788B2

(12) United States Patent
Faghri

(10) Patent No.: US 6,950,788 B2
(45) Date of Patent: Sep. 27, 2005

(54) COMPUTER-IMPLEMENTED SYSTEM AND METHOD FOR SIMULATING MOTOR VEHICLE AND BICYCLE TRAFFIC

(76) Inventor: Ardeshir Faghri, 114 Knoxlyn Farm Dr., Kennett Square, PA (US) 19348

(*) Notice: Subject to any disclaimer, the term of this patent is extended or adjusted under 35 U.S.C. 154(b) by 853 days.

(21) Appl. No.: 09/963,325

(22) Filed: Sep. 26, 2001

(65) Prior Publication Data

US 2002/0062207 A1 May 23, 2002

Related U.S. Application Data

(60) Provisional application No. 60/235,702, filed on Sep. 27, 2000.

(51) Int. Cl.[7] ............................ G06F 7/48; G06F 17/10

(52) U.S. Cl. ............................... 703/8; 703/2; 701/300; 434/61; 434/62

(58) Field of Search ......................... 703/8, 2; 702/142; 706/46, 47; 701/213, 300, 301; 434/61, 62

(56) References Cited

U.S. PATENT DOCUMENTS 6,370,475 B1 * 4/2002 Breed et al. ................ 701/301
6,405,132 B1 * 6/2002 Breed et al. ................ 701/301
6,526,352 B1 * 2/2003 Breed et al. ................ 701/213

OTHER PUBLICATIONS

Jula et al., H. Collision Avoidance Analysis for Lane Changing and Merging, IEEE Transactions on Vehicular Technology, vol. 49, No. 6, Nov. 2000, pp. 2295–2308.*

McDonald et al., M. Development of a Fuzzy Logic Based Microscopic Motorway Simulation Model, IEEE Conference on Intelligent Transportation System, ITSC 97, 1997, pp. 82–87.*

Das et al., S. Microscopic Simulations of Freeway Traffic Flow, 32nd Annual Simulation Symposium, Apr. 1999, pp. 79–84.*

Guizhu et al., W. Automatic Detecting System for Traffic Flow of Bicycles Based on Pattern Recognition and Classification, 1997 IEEE International Conference on Systems, Man, and Cybernetics, vol. 5, Oct. 1997, pp. 4360–4363.*

Baras et al., J. Estimation of Traffic Platoon Structure from Headway Statistics, IEEE Transactions on Automatic Control, vol. 24, No. 4, Aug. 1979, pp. 553–559.*

(Continued)

*Primary Examiner*—Russell Frejd
(74) *Attorney, Agent, or Firm*—Connolly Bove Lodge & Hutz LLP

(57) ABSTRACT

A computer-implemented system and method for simulating the movement of motor vehicle and bicycle traffic in an environment. Among other things, the system and method scan all traffic signals in the environment over a predetermined time interval, and then update parking activity, pedestrian movement, and motor vehicle and bicycle movement in the environment. The system and method also check whether any parking activity was generated for the predetermined time period, and simulates pedestrian movement in the environment. Finally, the system and method simulate motor vehicle and bicycle movement in the environment using predetermined acceleration and deceleration rates, a motor vehicle following model, and a lane changing model.

12 Claims, 33 Drawing Sheets

OTHER PUBLICATIONS

Park et al., J–H. Neuro–Fuzzy Control of Converging Vehicles for Automated Transportation Systems, IEEE, Proceedings of the 1999 American Control Conference, vol. 6, Jun. 1999, pp. 4193–4197.*

Chen et al., S Automatic Traffic Monitoring by Intelligent Sound Detection, IEEE Conference on Intelligent Transportation System, ITSC 97, pp. 171–176.*

Katz, J.H. Simulation of a Traffic Network, Communications of the ACM, vol. 6, No. 8, Aug. 1963, pp. 480–486.*

Chang et al., G.–L. Simulating Network Traffic Flows with a Massively Parallel Computing Architecture, Proceedings of the $2^{th}$ Winter Simulation Conference, Dec. 1993, pp. 762–770.*

Schulze et al., T. Urban Traffic Simulation with Psycho–Physical Vehicle–Following Models, Proceedings of the 29th Winter Simulation Conference, Dec. 1997, pp. 1222–1229.*

Randhawa et al., S.U. A Simulation–Based Analysis of Parking System Perfomance, Proceedings of the 25th Winter Simulation Conference, Dec. 1993, pp. 1231–1238.*

* cited by examiner

TABLE 1

| | | Major Road | | | | | | Minor Road | | | | | |
|---|---|---|---|---|---|---|---|---|---|---|---|---|---|
| | | Right | | Left | | Thru | | Right | | Left | | Thru | |
| | | S | M | S | M | S | M | S | M | S | M | S | M |
| In Bike Coming From | Adjacent | 2.5 | 2 | x | x | x | x | 3 | 2 | x | x | x | x |
| | Left | x | x | x | x | x | x | 4 | 3 | 4.5 | 4 | 4 | 3.5 |
| | Right | x | x | x | x | x | x | x | x | 4.5 | 4 | 4 | 3.5 |
| | Oppose | x | x | 4.5 | 4 | x | x | x | x | 4.5 | 4 | x | x |
| In MV Coming From | Left | x | x | x | x | x | x | 6 | 5 | 6.5 | 6 | 6 | 5.5 |
| | Right | x | x | x | x | x | x | x | x | 6.5 | 6 | 6 | 5.5 |
| | Oppose | x | x | 6.5 | 6 | x | x | x | x | 6.5 | 6 | x | x |

*S=stopped* *M=moving*

TABLE 2

| | | Major Road | | | | | | Minor Road | | | | | |
|---|---|---|---|---|---|---|---|---|---|---|---|---|---|
| | | Right | | Left | | Thru | | Right | | Left | | Thru | |
| | | S | M | S | M | S | M | S | M | S | M | S | M |
| In Bike Coming From | Left | x | x | x | x | x | x | 5 | 3 | 6 | 4 | 5.5 | 3.5 |
| | Right | x | x | x | x | x | x | x | x | 6 | 4 | 5.5 | 3.5 |
| | Oppose | x | x | 6 | 4 | x | x | x | x | 6 | 4 | x | x |
| In MV Coming From | Left | x | x | x | x | x | x | 7 | 5 | 8 | 6 | 7.5 | 5.5 |
| | Right | x | x | x | x | x | x | x | x | 8 | 6 | 7.5 | 5.5 |
| | Oppose | x | x | 8 | 6 | x | x | x | x | 8 | 6 | x | x |

*S=stopped* *M=moving*

TABLE 3

| | Parking | Leaving |
|---|---|---|
| 1 | 3.72 | 2.38 |
| 2 | 3.99 | 2.33 |
| 3 | 3.17 | 2.74 |
| 4 | 2.96 | 5.07 |
| 5 | 4.88 | 3.26 |
| 6 | 3.76 | 6.21 |
| 7 | 2.91 | 8.51 |
| 8 | 2.59 | 3.42 |
| 9 | 6.95 | 3.65 |
| 10 | 4.58 | 3.72 |
| 11 | 2.94 | 3.94 |
| 12 | 6.18 | 5.51 |
| 13 | 8.94 | 3.6 |
| 14 | 4.05 | 6.37 |
| 15 | 2.69 | 5.38 |
| Average: | 4.287333 | 4.406 |
| Average for both: | | 4.346667 |

TABLE 4

| Node # | Buslines | Name | Headw. | Name | Headw. | Name | Headw. | Name | Headw. | Name | Headw. | Name | Headw |
|---|---|---|---|---|---|---|---|---|---|---|---|---|---|
| 1 | 3 | 33 | 1800 | UD(T/T) | 1200 | UD(E1) | 2400 | | | | | | |
| 2 | | | | | | | | | | | | | |
| 3 | 2 | UD(P/S) | 2400 | UD(S) | 600/1200** | | | | | | | | |
| 4 | | | | | | | | | | | | | |
| 5 | | | | | | | | | | | | | |
| 6 | 5 | 302 | 12000 | 6 | 1800 | UD(L) | 780/1500* | UD(E1) | 2400 | UD(E2) | 2100 | | |
| 7 | | | | | | | | | | | | | |
| 8 | 4 | 33 | 1800 | 34 | 3000 | 6 | 1800 | UD(E2) | 2100 | | | | |
| 9 | 1 | UD(P/S) | 2400 | | | | | | | | | | |
| 10 | | | | | | | | | | | | | |
| 11 | 6 | 33 | 1800 | UD(T/T) | 1200 | UD(P/S) | 2400 | UD(L) | 780/1500* | UD(E1) | 2400 | UD(E2) | 2100 |
| 12 | 2 | 33 | 1800 | 6 | 1800 | | | | | | | | |
| 13 | | | | | | | | | | | | | |

*Notes:* *(1) Headways are in seconds.*
*(2) Headways for non-UD buses are approximate.*
** changes at 2:15 pm*
***changes at 2:04 pm*

COMPUTER-IMPLEMENTED SYSTEM AND METHOD FOR SIMULATING MOTOR VEHICLE AND BICYCLE TRAFFIC

CLAIM OF PRIORITY

Priority is claimed under 35 U.S.C. § 119(e) from U.S. Provisional Application Ser. No. 60/235,702, filed Sep. 27, 2000, the disclosure of which is herein incorporated by reference in its entirety.

BACKGROUND OF THE INVENTION

A. Field of the Invention

The present invention relates generally to traffic simulators, and, more particularly, to a computer-implemented system and method for simulating motor vehicle and bicycle traffic.

B. Description of the Related Art

Because most real-world systems are too complex to be evaluated analytically, they are often studied by means of simulation. In a simulation a computer is used to evaluate a model numerically, and data are gathered in order to estimate the desired true characteristics of the model. Another definition states that simulation is the process of designing a computerized model of a system (or process) and conducting experiments with this model for the purpose either of understanding the behavior of the system or of evaluating various strategies for the operation of the system.

Computer simulation models play a major role in the analysis of the transportation system and its components. For this purpose simulation can be defined as a numerical technique for conducting experiments on a digital computer, which may include stochastic characteristics, be microscopic or macroscopic in nature, and involve mathematical models that describe the behavior of a transportation system over extended periods of real time. By representing a traffic system as a simulation model, the effects of traffic management strategies on the system's operational performance can be measured and expressed in terms of Measures of Effectiveness (MOE).

One of the advantages of traffic simulation is its lower cost and time consumption than field experiments. Simulation can generate MOE, which cannot, in a practical sense, be obtained empirically. Disruption of traffic operations can be avoided and physical changes to existing facilities, not acceptable in the field, can be tested. Also simulation provides a high level of detail and accuracy for analyses of operational impact of future traffic demand. Computer simulation can be used for the comparison of actual planning and design alternatives, as well as for the research and development of new methods and strategies. One of the main advantages of simulation is the possibility to test different alternatives in exactly the same traffic situation in the office. Another is the great amount of detailed data about vehicle movements that can be collected, assuming that the simulation model is able to describe correctly the basic functions and interactions between vehicles, the traffic environment, and the signal control.

Traffic simulation models can be categorized, based on their level of detail, as macroscopic and microscopic. In microscopic traffic simulation the traffic is composed of individual vehicles rather than being a continuous flow. The flow and process type of traffic behavior should appear as a consequence of a large number of vehicles and their interactions. Thus the vehicle is the most active component with a major role in microscopic simulation. Macroscopic models take into consideration only the aggregate characteristics of vehicles composing the flow.

To be useful, traffic simulation must provide reasonable estimates of real world data, the time required to simulate the problem must be reasonable, and the results of the simulation must be accessible in a meaningful format. When modeling a complex real-world system it is usually not necessary to have a one-to-one correspondence between each element of the system and the model. It must be determined which aspects of the system are needed in the model, and what aspects can be ignored. Given a limited amount of time, money, and data available to develop the model, the focus should obviously be on the most important factors. Models are not universally valid since they are designed for specific purposes. On the other hand, the model must have enough detail to be credible.

The flexibility of simulation makes it possible not only to create simplified models of real systems, but also to take into account some of the basic laws governing the real world, which are the dynamic and stochastic natures of systems.

Because of the dynamic nature of most real world systems, one of the main elements of the simulation models is time. One of the principal approaches for advancing the simulation clock in a discrete simulation model is the fixed-increment time advance. With this approach, after the simulation clock is advanced by some appropriately chosen $\Delta t$ time period, a check is made to determine if any events should have occurred during the previous interval of length $\Delta t$. Any observable change in the status of the simulated system is considered an event. The system state variables and statistical counters are updated accordingly. A set of rules must be built into the model to decide in what order to process events when two or more events are considered to occur during the same interval.

The main disadvantages of this approach are the errors introduced by processing events in time intervals, and the necessity to decide which event to process first. These problems can be made less severe by making $\Delta t$ smaller. This on the other hand increases the number of checks for event occurrences, and thus the execution time.

The main reason for using this time scanning principle in traffic simulation models is, that in this kind of detailed model the number of events is high in relation to time, and thus the number of parallel occurrences is high. In case of event-oriented simulation this would lead to extremely short time steps. When the average number of events during a time period is significantly higher than one, the use of the time scanning approach is recommended. Another reason is that in traffic simulation programs a complex interaction process is modeled, which makes it difficult to forecast future events. Because the fixed-increment time advance method operates on "here and now" basis, it is more suitable for modeling these processes.

The simulation of any stochastic system or process requires generating or obtaining numbers that are random, in some sense. Random variates generated from the U(0, 1) distribution are called random numbers. Although the numbers generated by the random number generators are pseudo-random numbers, this inaccuracy does not have an impact on most of the practical simulation applications. Random variates from other distributions can be obtained from U(0,1) random numbers through various transformation techniques.

Exponential random variates, necessary to model Poisson arrival processes, can be generated by the inverse-transform algorithm. This method is based on the property that the cumulative distribution functions of random variables are on interval [0,1], which corresponds to the range of uniformly distributed random numbers. Based on this method the algorithm for generating exponential random variates can be written as:

1. Generate U~U (0, 1)

2. Return $X=-\beta \ln U$ where X is an exponential variable with the mean $\beta>0$. This algorithm is used to generate inter-arrival times of Poisson arrival processes.

Although traffic simulation models exist, most only simulate vehicular or motor vehicle traffic. These models fail to take into consideration bicycle and pedestrian traffic. Thus, there is a significant need in the art to provide a model that simulates motor vehicle traffic, as well as bicycle and pedestrian traffic.

SUMMARY OF THE INVENTION

The present invention solves the problems of the related art by providing a computer-implemented system and method for simulating motor vehicle and bicycle traffic.

As embodied and broadly described herein, the invention comprises a computer-implemented method that simulates the movement of motor vehicle and bicycle traffic in an environment, the method comprising the steps of: scanning all traffic signals in the environment over a predetermined time interval; updating parking activity, and motor vehicle and bicycle movement in the environment; checking whether any parking activity was generated for the predetermined time period; and simulating motor vehicle and bicycle movement in the environment using predetermined acceleration and deceleration rates, a motor vehicle and bicycle following model, and a lane changing model.

As further embodied and broadly described herein, the invention comprises a system for simulating the movement of motor vehicle and bicycle traffic in an environment, the system comprising: a memory configured to store instructions; and a processor configured to execute instructions for: scanning all traffic signals in the environment over a predetermined time interval, updating parking activity, and motor vehicle and bicycle movement in the environment, checking whether any parking activity was generated for the predetermined time period, and simulating motor vehicle and bicycle movement in the environment using predetermined acceleration and deceleration rates, a motor vehicle following model, and a lane changing model.

As still further embodied and broadly described herein, the invention comprises a computer readable medium that stores instructions executable by at least one processor to perform a method for simulating the movement of motor vehicle and bicycle traffic in an environment, comprising: instructions for scanning all traffic signals in the environment over a predetermined time interval; instructions for updating parking activity, and motor vehicle and bicycle movement in the environment; instructions for checking whether any parking activity was generated for the predetermined time period; and instructions for simulating motor vehicle and bicycle movement in the environment using predetermined acceleration and deceleration rates, a motor vehicle and bicycle following model, and a lane changing model.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS AND TABLES

The present invention will become more fully understood from the detailed description given hereinbelow and the accompanying drawings and tables which are given by way of illustration only, and thus are not limitative of the present invention, and wherein.

Figure 2:
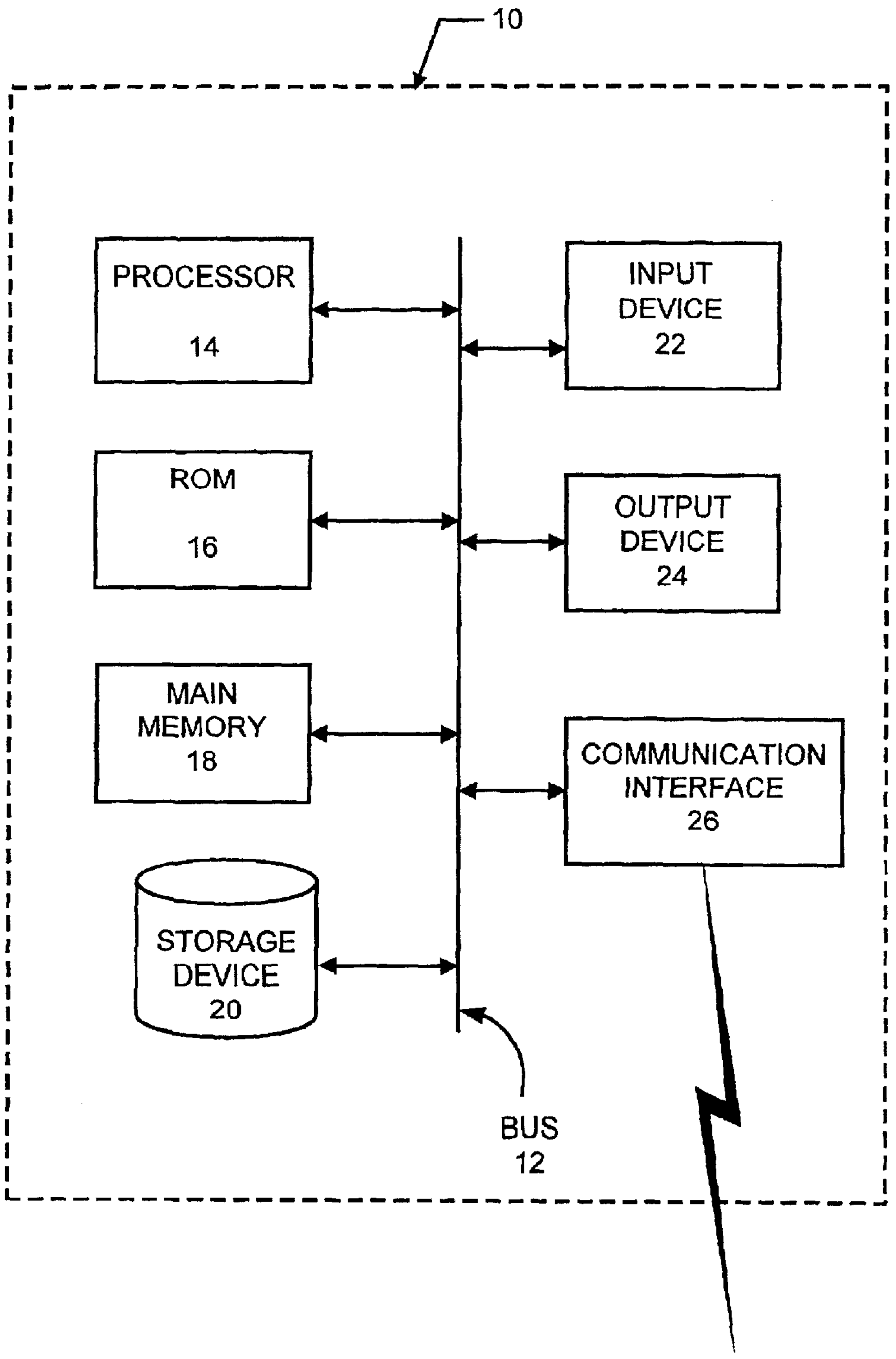
FIG. 2 is a schematic diagram showing a computing device of the system of FIG. 1.
Figure 10:
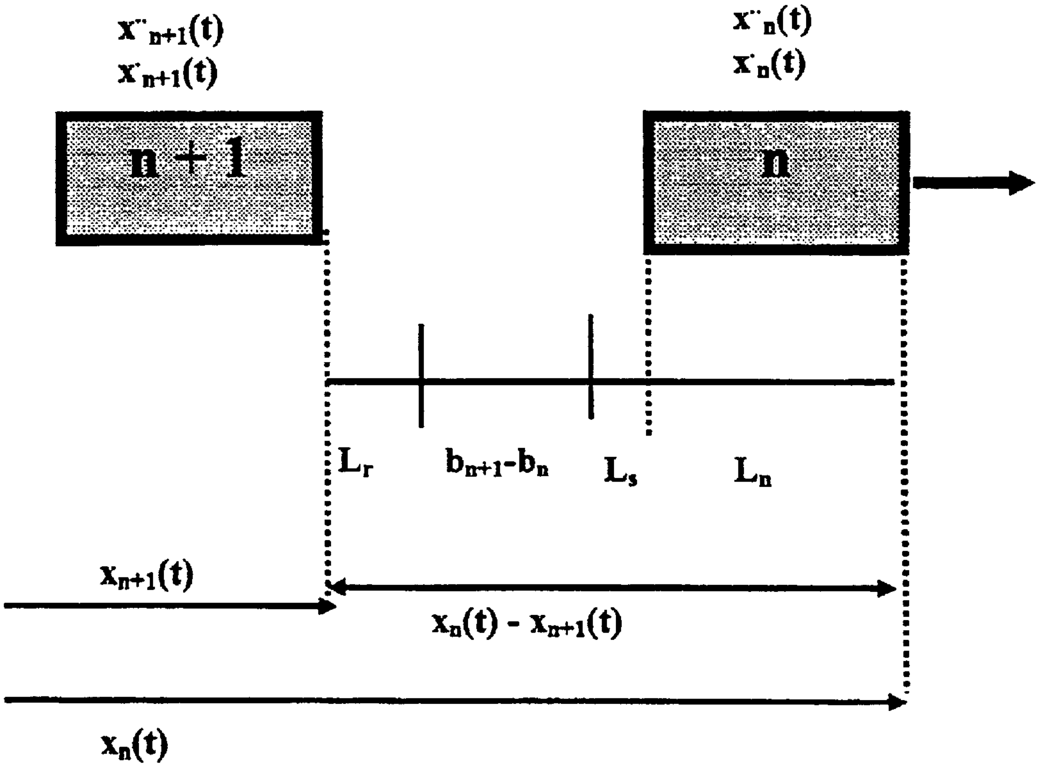
Figure 11:
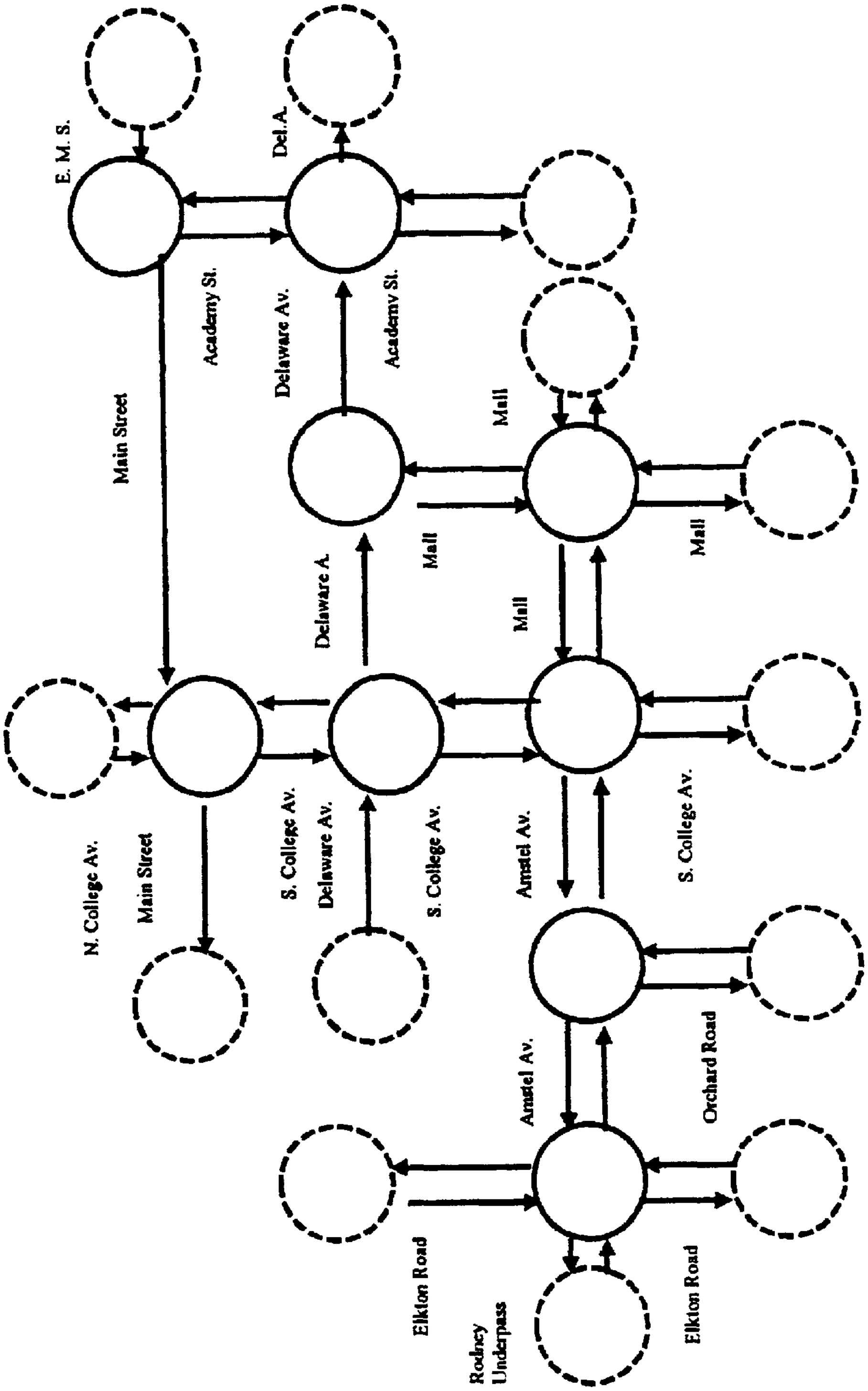
Figure 12:
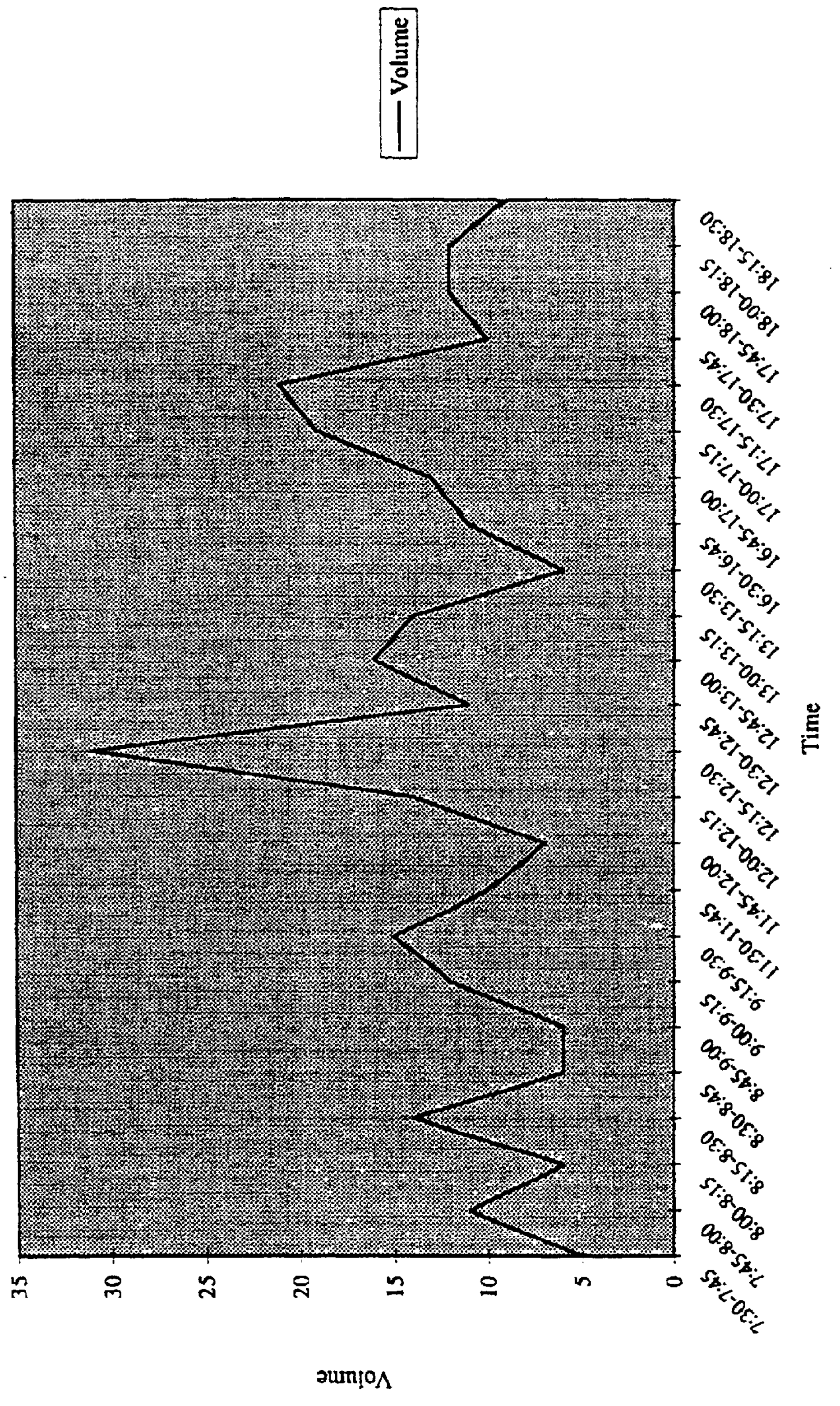
Figure 13:
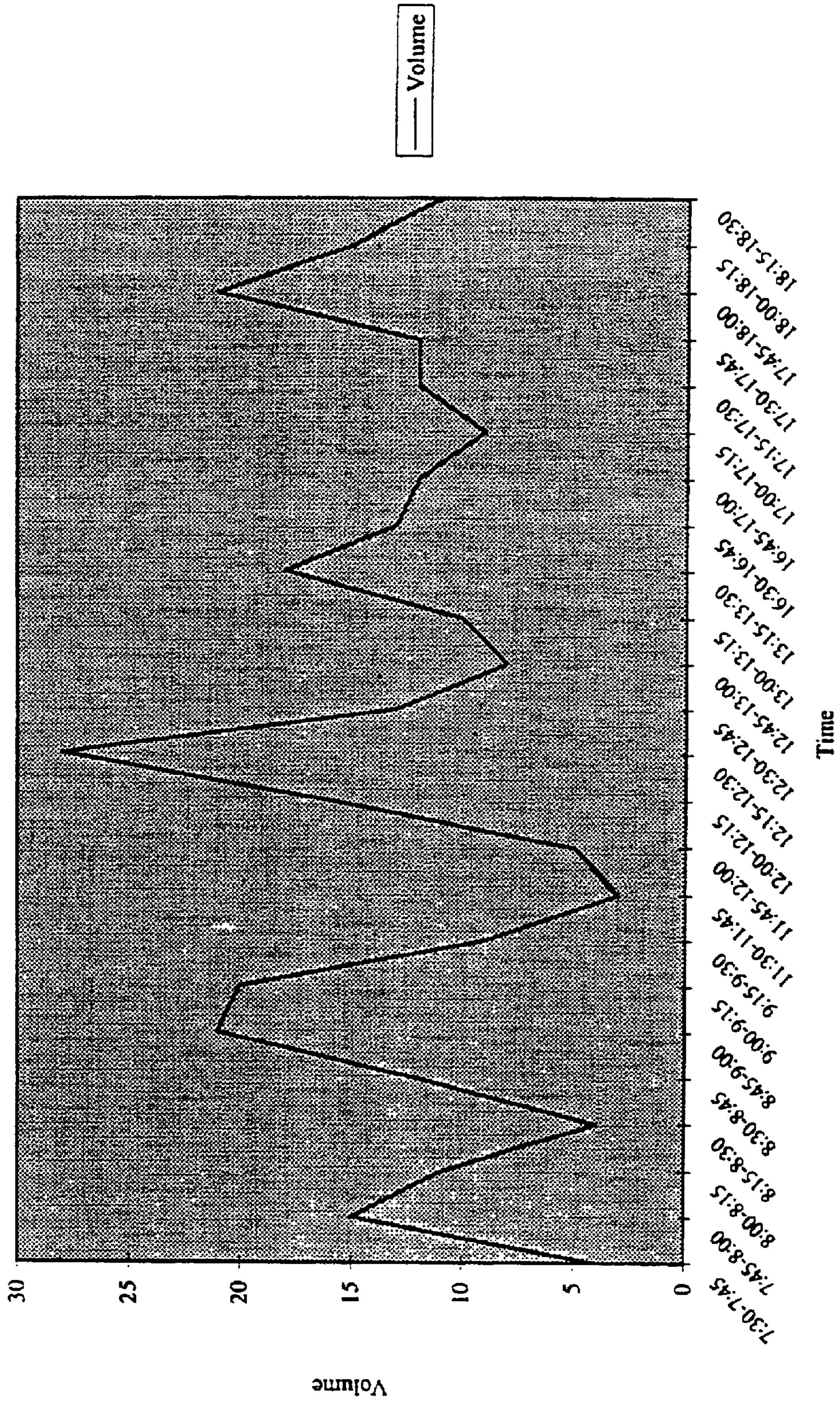
Figure 14:
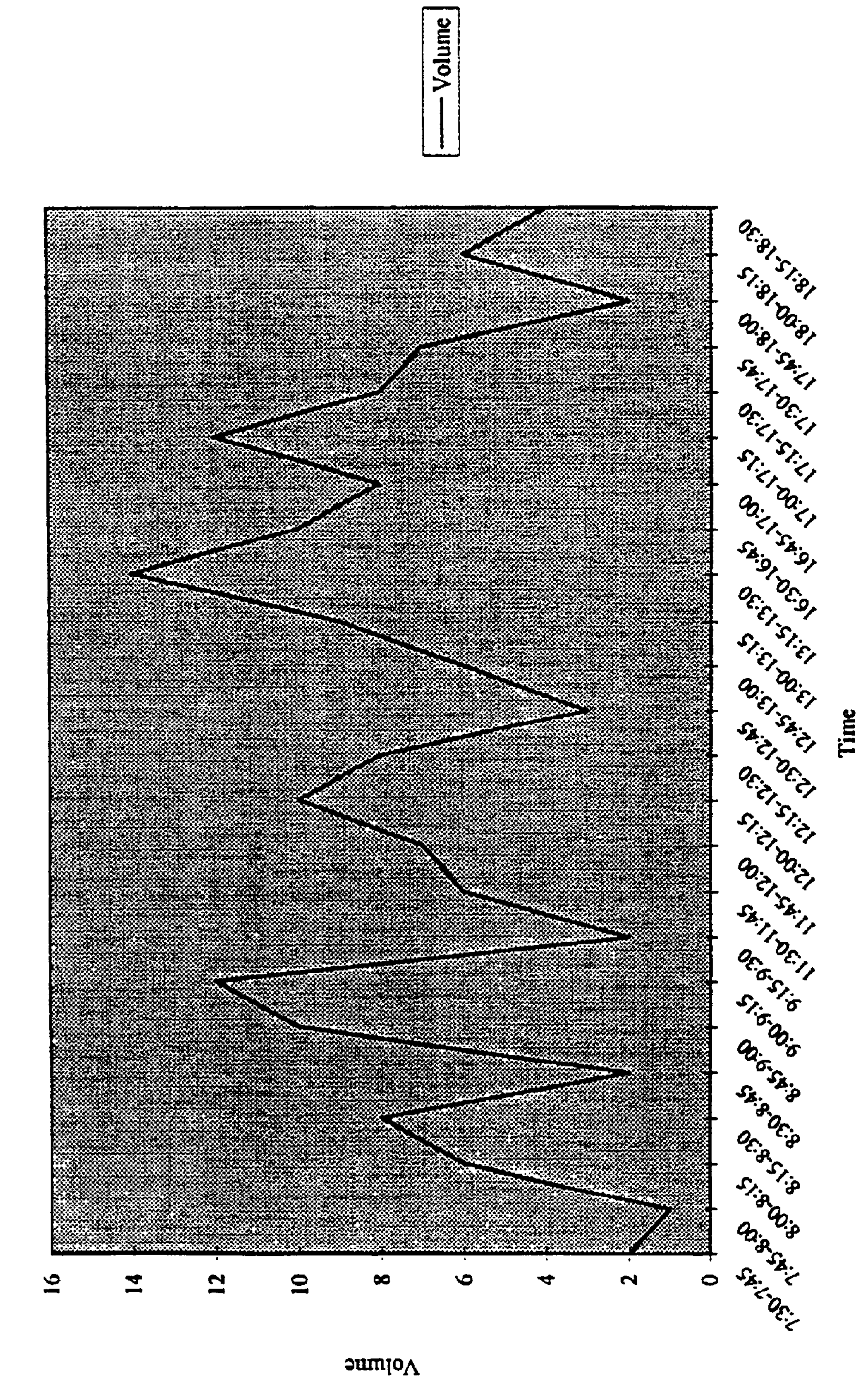
Figure 15:
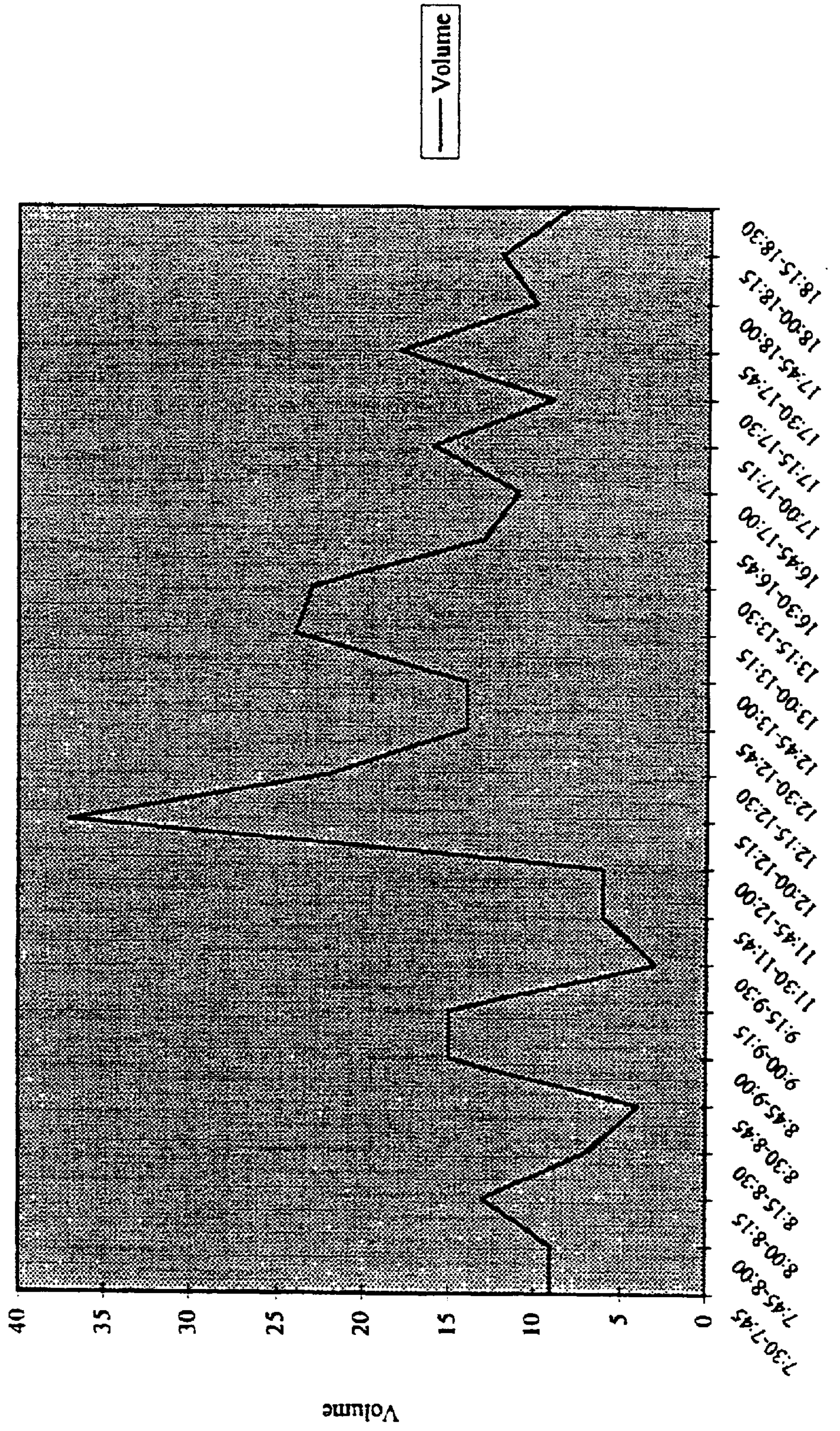
Figure 16:
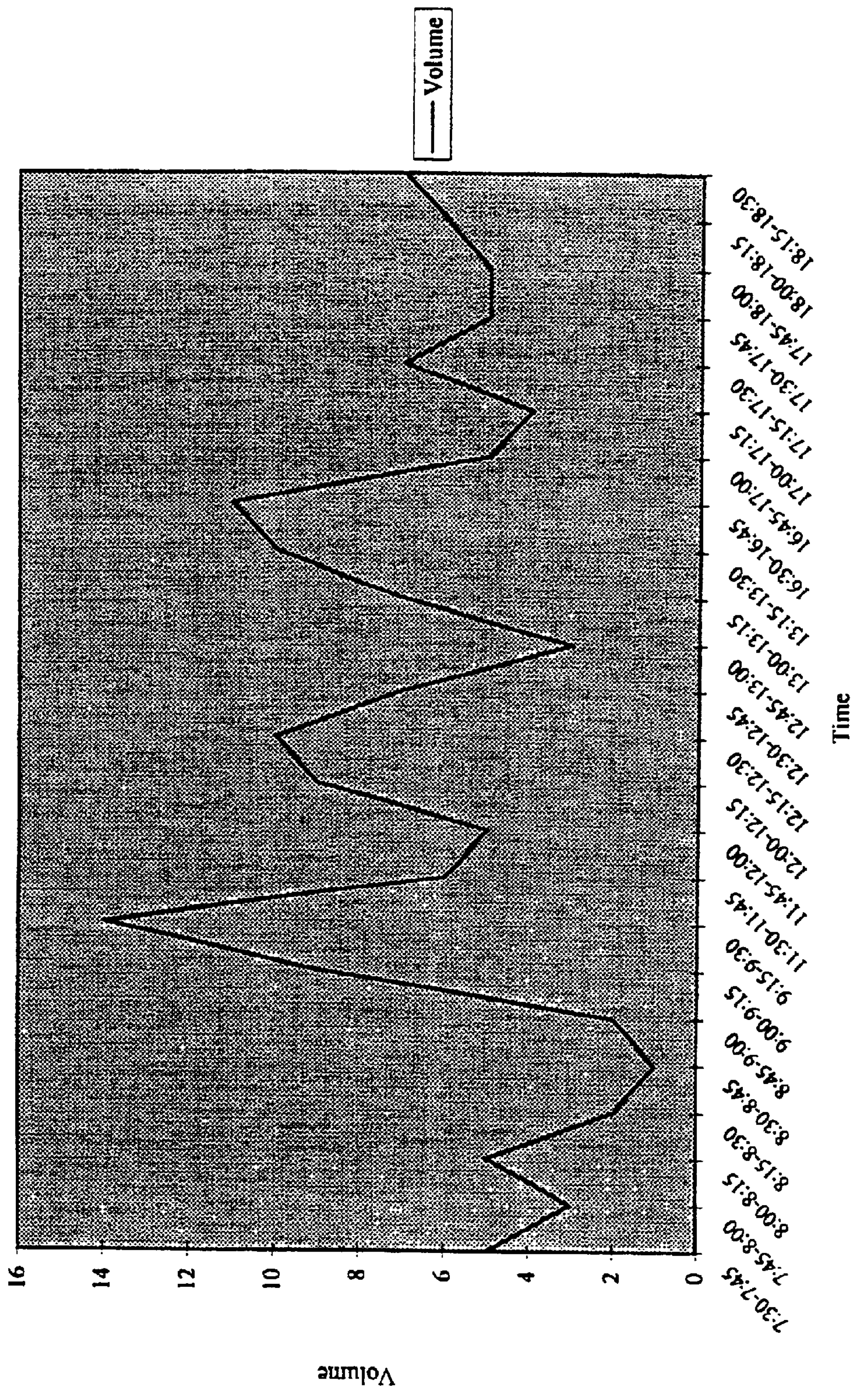
Figure 17:
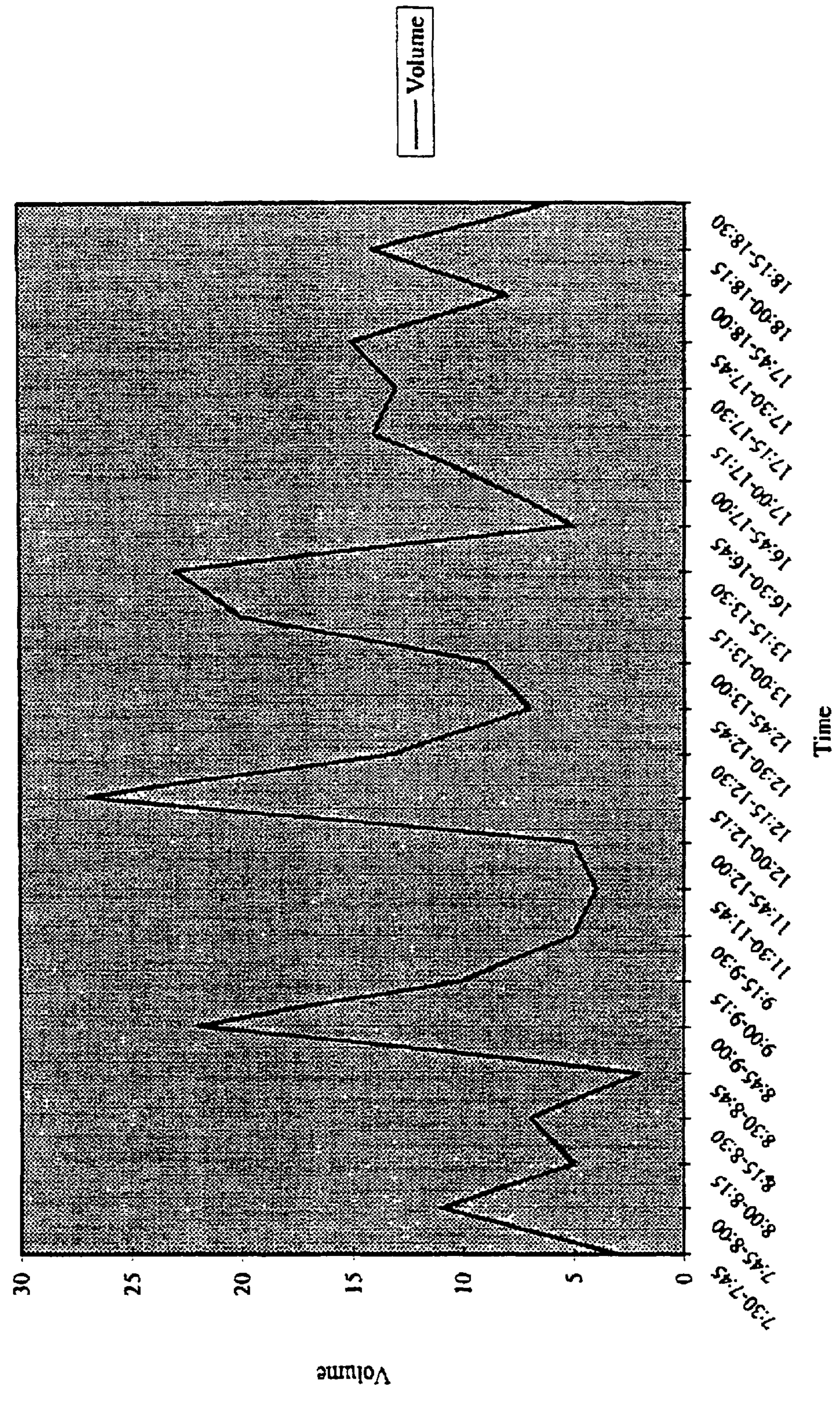
Figure 18:
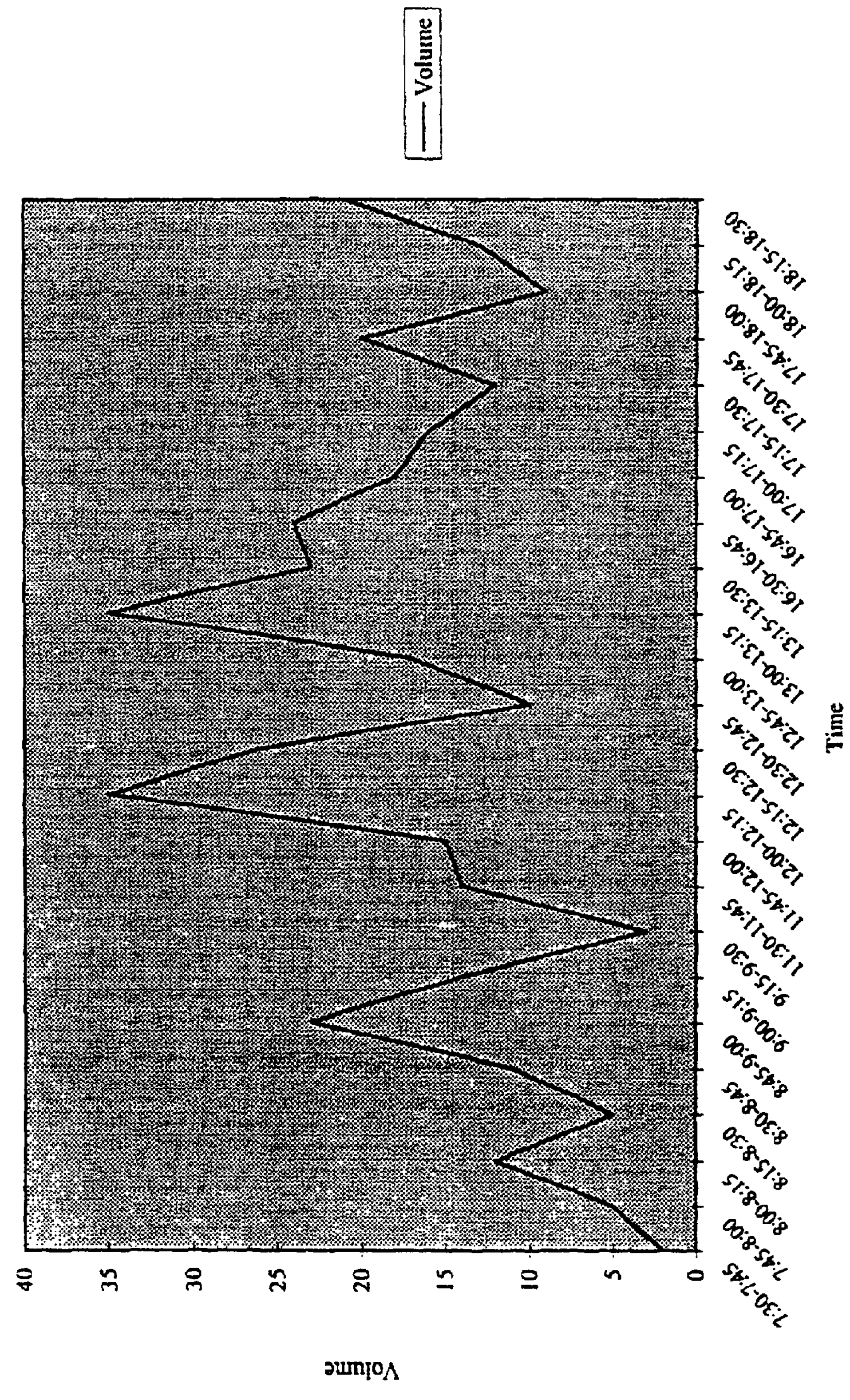
Figure 19:
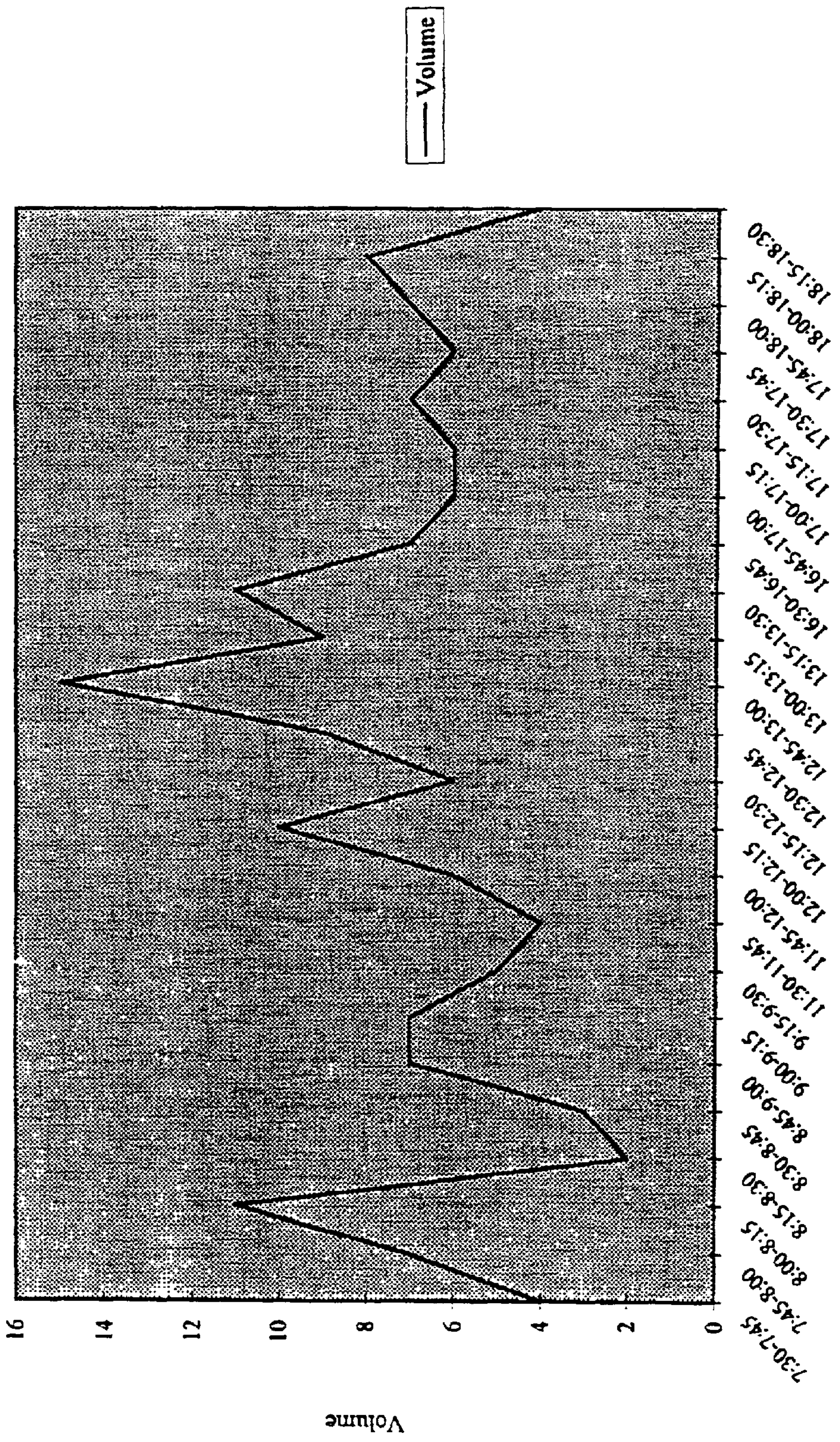
Figure 20:
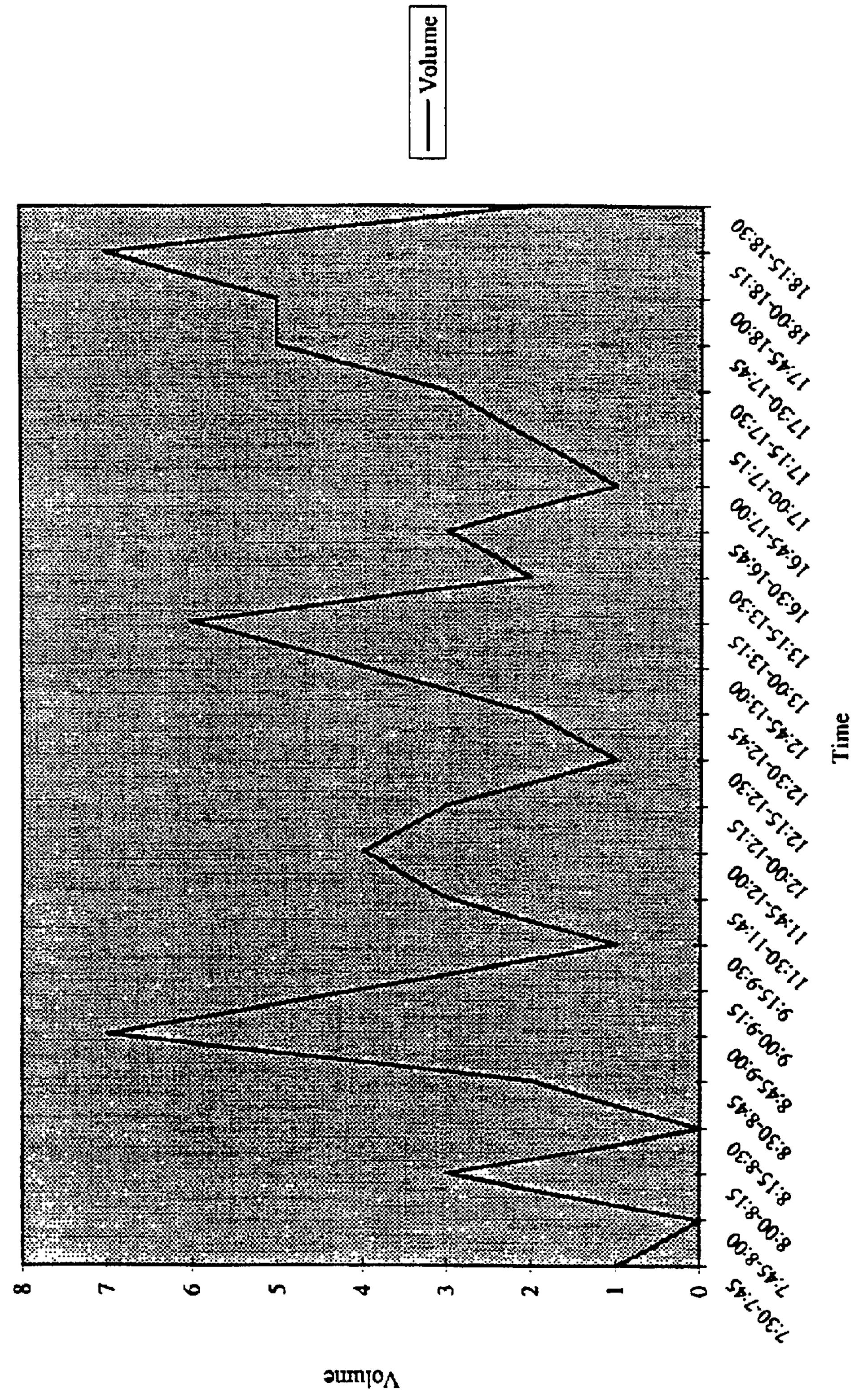
Figure 21:
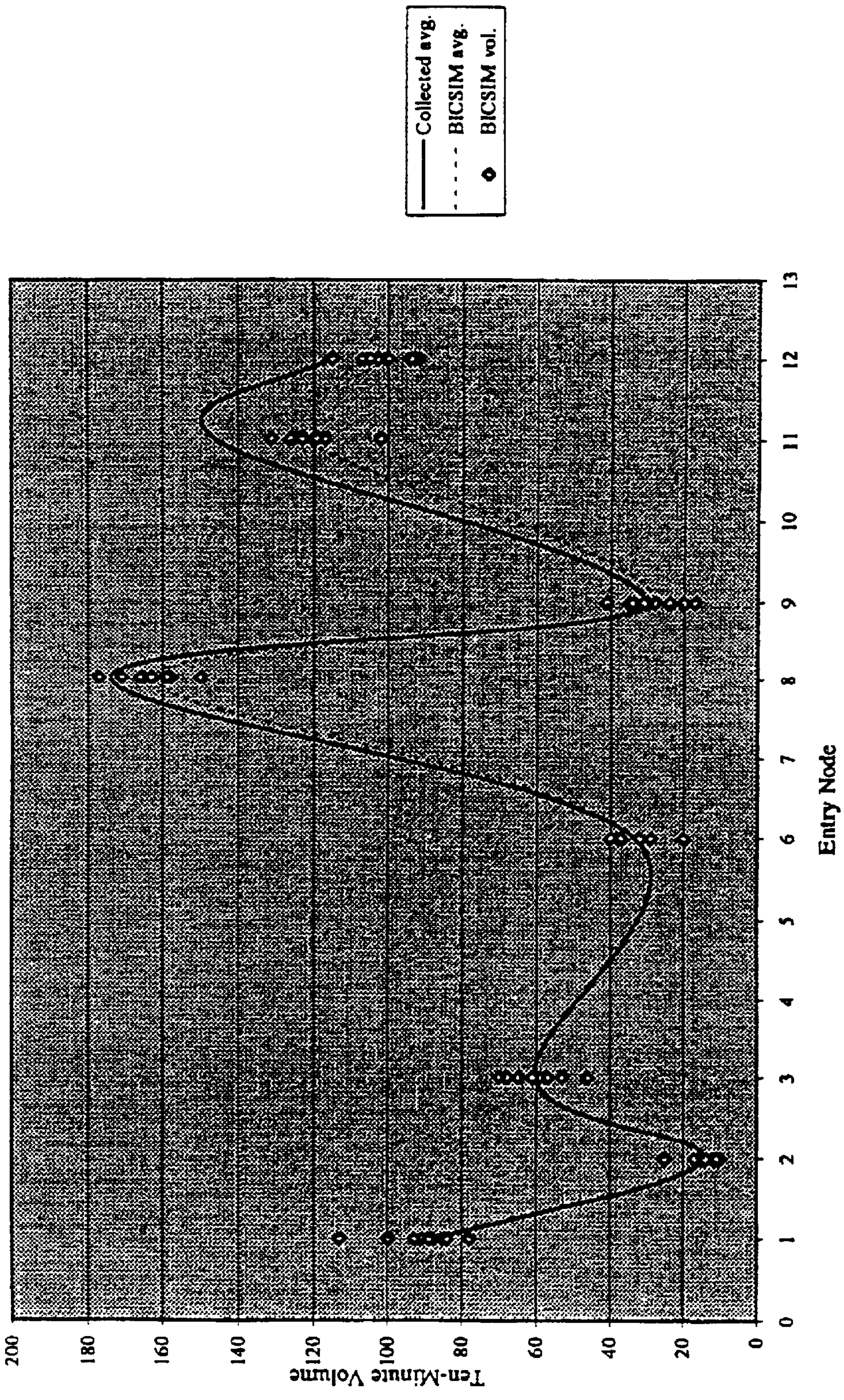
Figure 22:
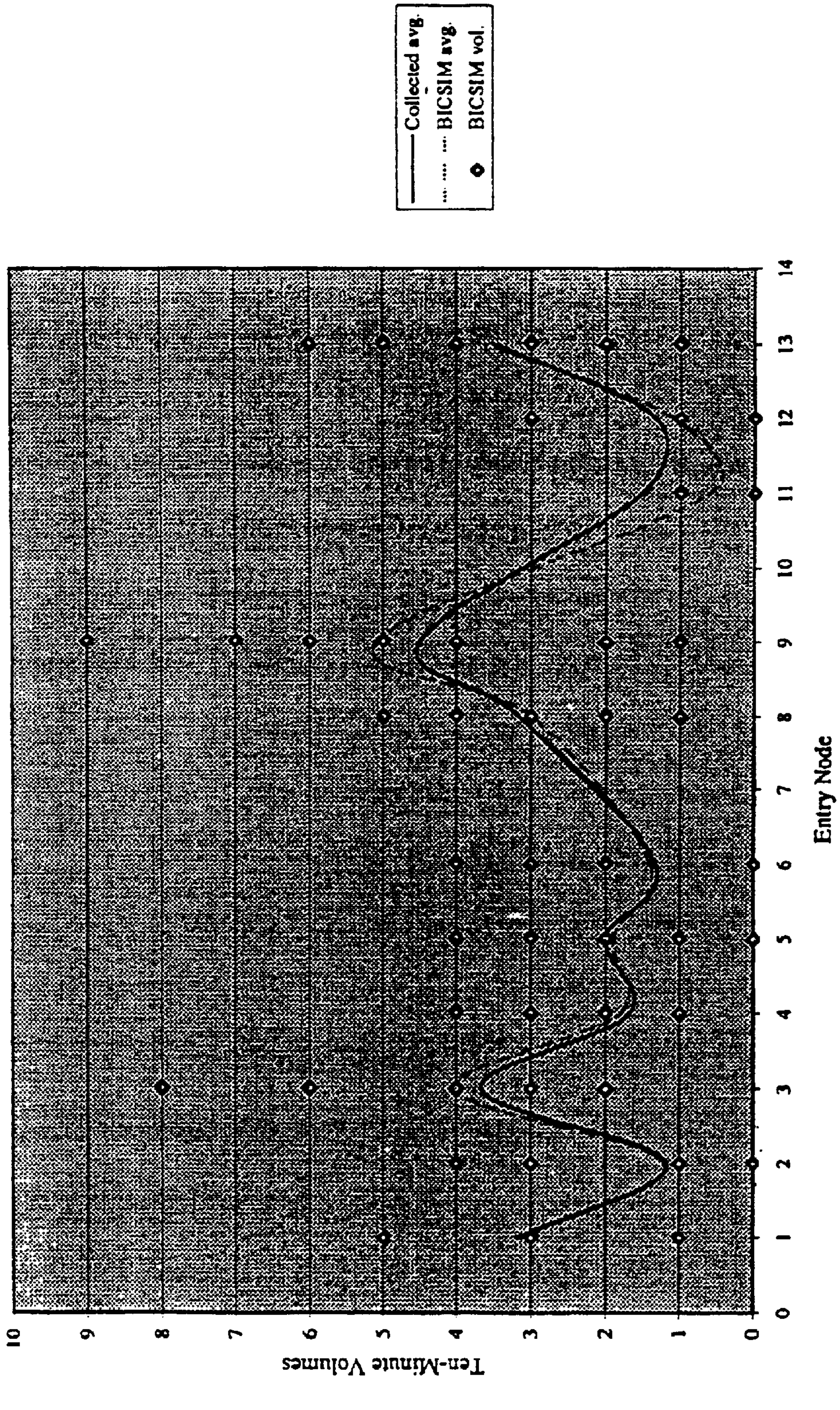
Figure 23:
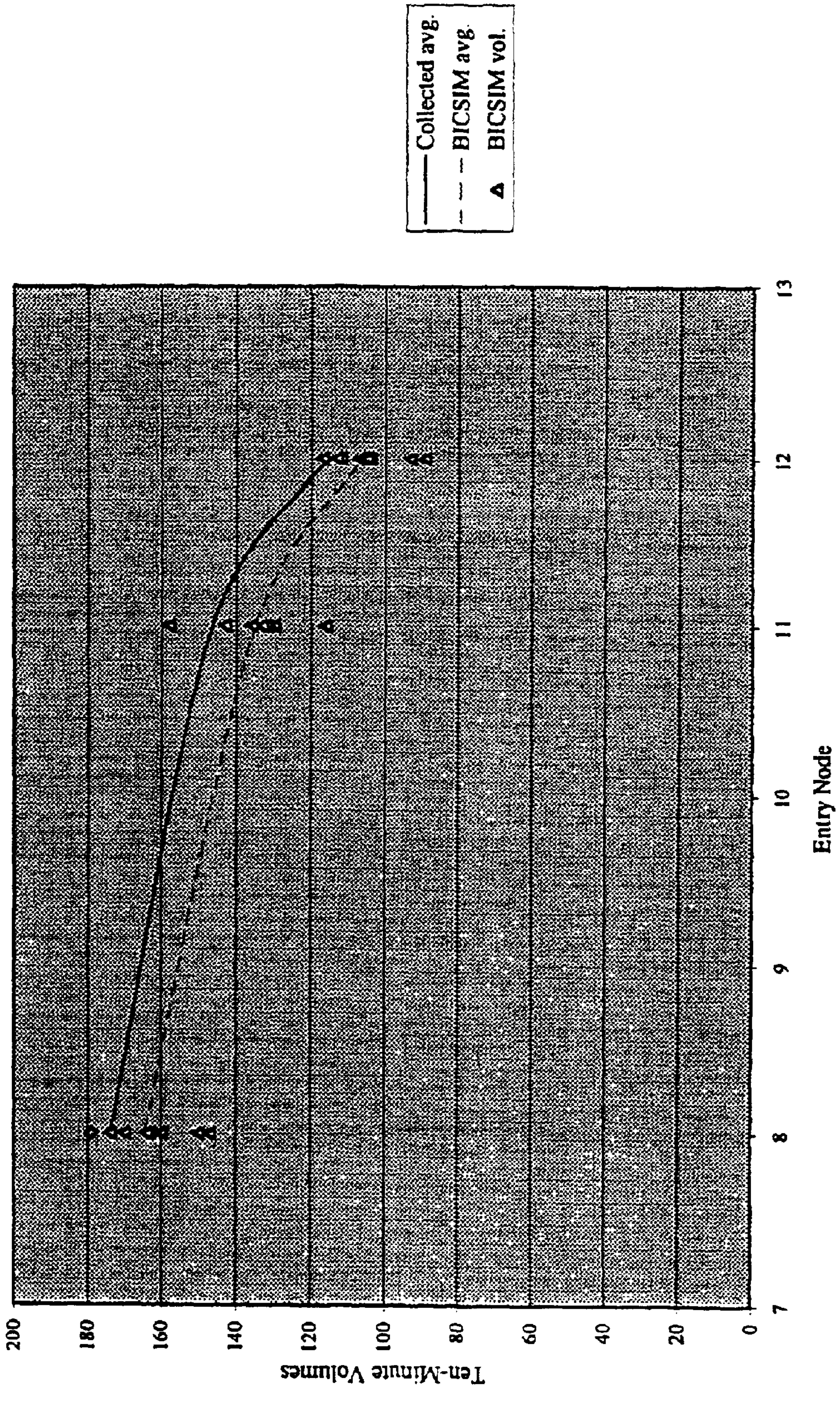
Figure 24:
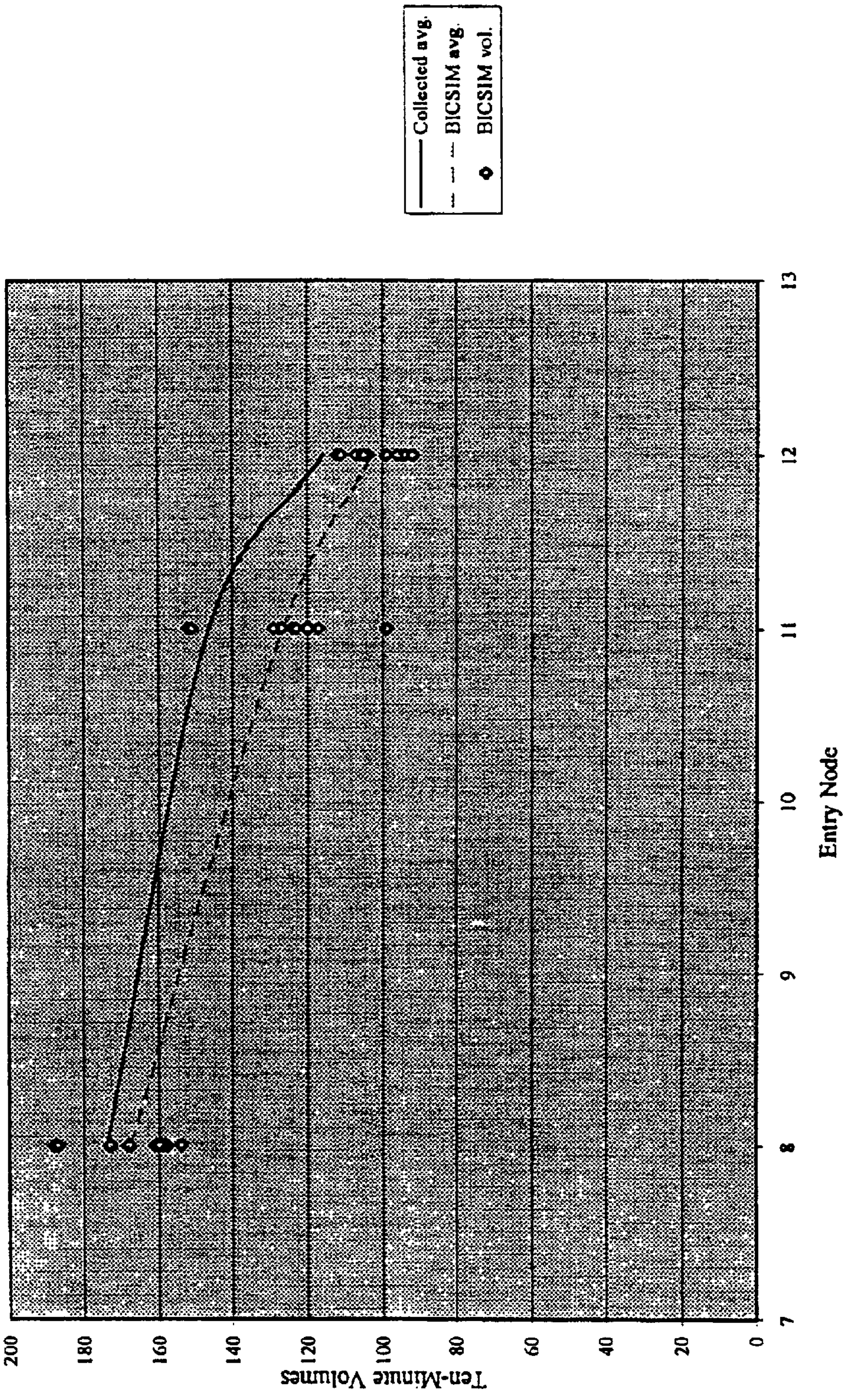
Figure 25:
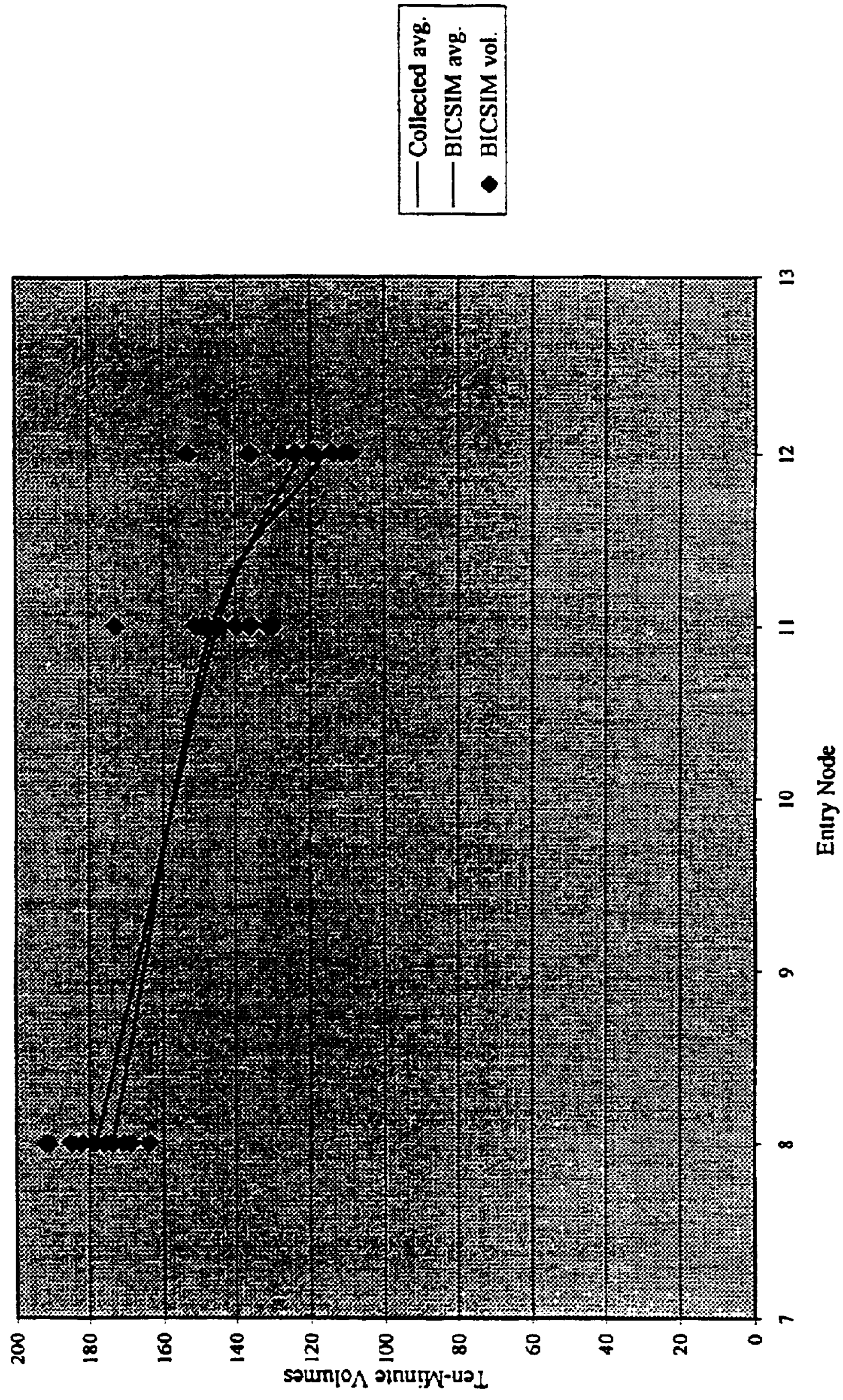

FIGS. 3–6, 7A–7C, 8A–8D, and 9 are flow charts showing the BICSIM method in accordance with an embodiment of the present invention, the method being performed by the computing device shown in FIG. 2;

FIG. 10 is a schematic diagram showing the mathematical connection between the microscopic and macroscopic theories of traffic flow;

FIG. 11 is a graphical representation of an exemplary network created using the system and method of the present invention;

FIGS. 12–20 are graphs showing the variations of bicycle volumes at each considered to location;

FIGS. 21 and 22 are graphs showing the correspondence between the real-world and BICSIM 10-minute volumes;

FIGS. 23–25 are graphs showing motor vehicle volumes;

Tables 1 and 2 are tables containing the accepted gaps used in the BICSIM method of the present invention; and Tables 3 and 4 are tables showing exemplary data used in testing the BICSIM method of the present invention.

DETAILED DESCRIPTION OF THE PREFERRED EMBODIMENTS

The following detailed description of the invention refers to the accompanying drawings.

The same reference numbers in different drawings identify the same or similar elements. Also, the following detailed description does not limit the invention. Instead, the scope of the invention is defined by the appended claims and equivalents thereof.

Figure 1:
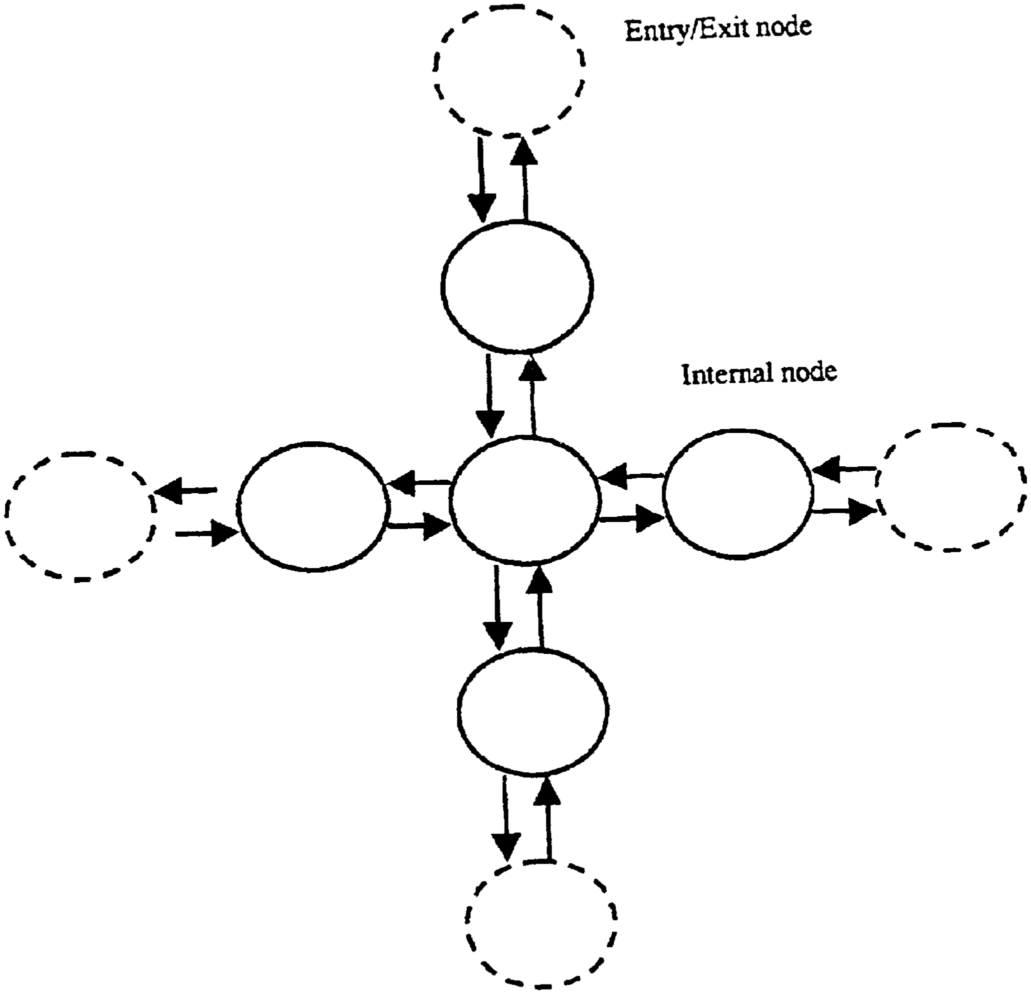
FIG. 1 is a schematic diagram showing a system of an embodiment of the present invention.

The simulation model in accordance with the present invention, BICSIM (BICycle SIMulation), is a simulation model of an urban road network with flow of mixed motor vehicle and bicycle traffic. BICSIM is a microscopic model, treating each motor vehicle and bicycle on the network as an identifiable entity. These vehicles interact with other vehicles and are affected by the traffic environment. This environment consists of traffic control, infrastructure (channelization, geometry) and other users of the road network (pedestrians, parking vehicles and bus stops). The road network is modeled as a network of nodes and unidirectional links, where nodes represent intersections or points where road characteristics change, and links represent unidirectional road segments. Vehicles enter and leave the network through entry/exit nodes. An example network is shown on FIG. 1.

BICSIM may be executed with conventional computing equipment, such as the computing device 10 shown in FIG. 2. Computing device 10 includes a bus 12 interconnecting a processor 14, a read-only memory (ROM) 16, a main memory 18, a storage device 20, an input device 22, an output device 24, and a communication interface 26. Bus 12 is a network topology or circuit arrangement in which all devices are attached to a line directly and all signals pass through each of the devices. Each device has a unique identity and can recognize those signals intended for it. Processor 14 includes the logic circuitry that responds to and processes the basic instructions that device 10. ROM 16 includes a static memory that stores instructions and date used by processor 14.

Computer storage is the holding of data in an electromagnetic form for access by a computer processor. Main memory 18, which may be a RAM or another type of dynamic memory, makes up the primary storage of device 10. Secondary storage of device 10 may comprise storage device 20, such as hard disks, tapes, diskettes, Zip drives, RAID systems, holographic storage, optical storage, CD-ROMs, magnetic tapes, and other external devices and their corresponding drives.

Input device 22 may include a keyboard, mouse, pointing device, sound device (e.g. a microphone, etc.), biometric device, or any other device providing input to device 10. Output device 24 may comprise a display, a printer, a sound device (e.g. a speaker, etc.), or other device providing output to device 10. Communication interface 26 may include network connections, modems, or other devices used for communications with other computer systems or devices.

As will be described below, a computing device 10 consistent with the present invention may perform the method for simulating motor vehicle, bicycle, and pedestrian traffic. Device 10 performs this task in response to processor 14 executing sequences of instructions contained in a computer-readable medium, such as main memory 18. A computer-readable medium may include one or more memory devices and/or carrier waves.

Execution of the sequences of instructions contained in main memory 18 causes processor 14 to perform processes that will be described later. Alternatively, hardwired circuitry may be used in place of or in combination with software instructions to implement processes consistent with the present invention. Thus, the present invention is not limited to any specific combination of hardware circuitry and software.

The model addresses the dynamic nature of the system. BICSIM uses interval scanning simulation (described below), with a variable, also called simulation clock, keeping track of the current value of simulated time. When the simulation starts the roadway network is empty, thus a fill-time, also called warm-up, period is used to load vehicles to the network, so that the statistics gathered have meaningful content. In BICSIM, the user defines the length of this fill-time. Preferably, the length of the warm-up period is the traversal time at free flow speed along the longest path in the network.

Figure 3:
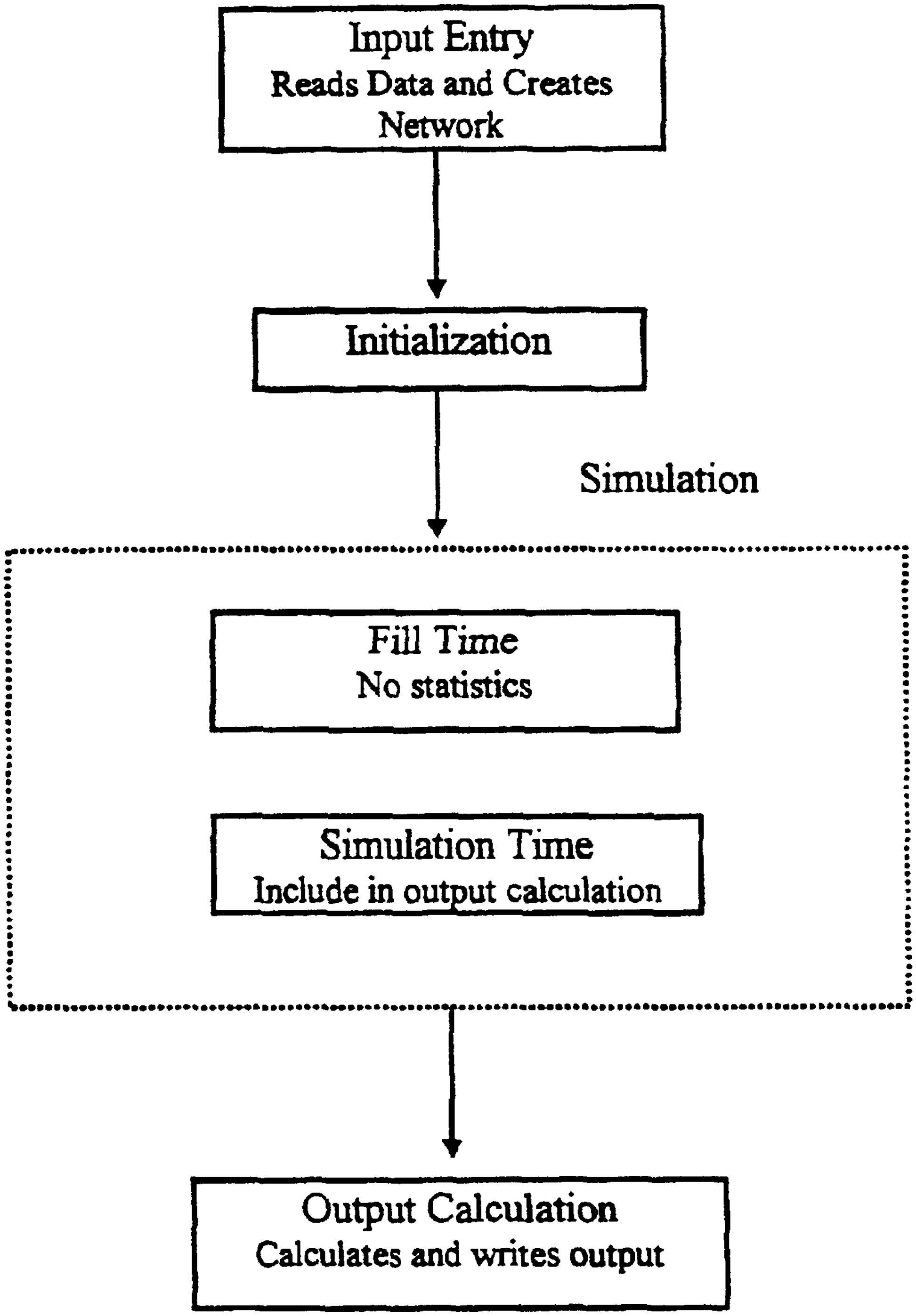
Figure 4:
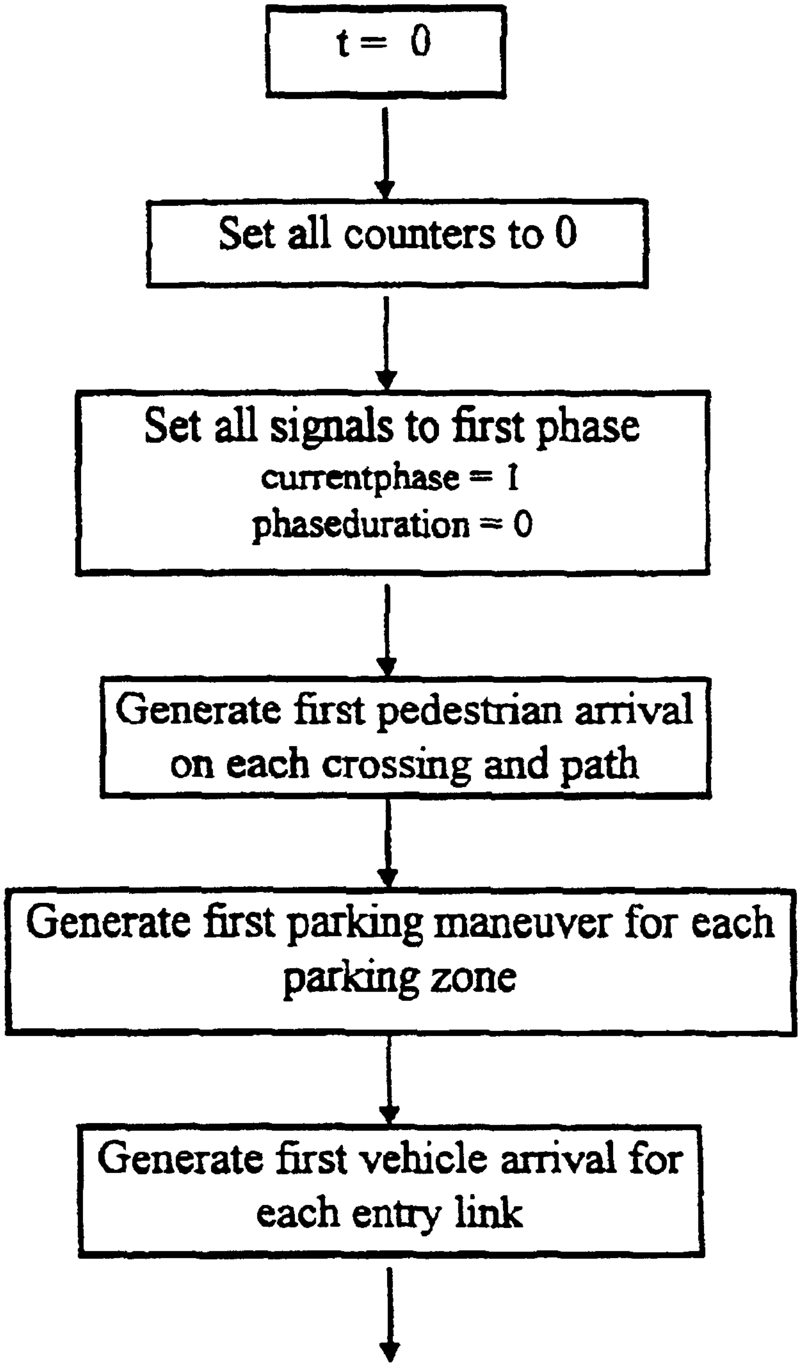

The model may be implemented in C++ programming language, which allows a modular software design. The program is based on function calls, and its main components are input entry, initialization, simulation and output calculation, as shown in FIG. 3. The following sections describe each of these components.

BICSIM was designed to model an entire network on which bicycles and motor vehicles travel together, while incorporating other aspects of the environment such as traffic signals, pedestrians, bus stops, and parked cars. This particular model is microscopic, which involves a high level of detail to examine the behavior of individual vehicles as opposed to the whole continuous flow. The computer code for BICSIM may be written in the C++ programming language. Modular programming software, such as C++, facilitates the validation and debugging process and allows any necessary changes to be made in a particular function without affecting the rest of the program. The main components of this simulation model are input entry, initialization, simulation, and output calculation.

The input data are read from text files and these should include information about the network geometry, traffic flow characteristics, traffic environment, and other users of the system. The road system is modeled as a network of nodes and links, where the nodes represent intersections and the links denote one-directional roads. In other words, a two-way street is modeled as two distinct links, one for each direction. Vehicles may only enter and leave the network through specified entry/exit nodes. Links can be identified as either roadways shared by motor vehicles and bicycles or multi-use paths shared by bicycles and pedestrians. Once the total number of links and nodes is identified, then specific data are read for each one. More detailed information about the geometry would then include the length and width of the road, grade, number of lanes, and lane channelization. Lanes are designated as shared or bike-only. The basic traffic flow characteristics needed for BICSIM are volume and speed. The program reads the hourly motor vehicle and bicycle volumes for each entry node and automatically converts these into inter-arrival times (headway). Some of the speed characteristics are already built into the program. For instance, the average acceleration/deceleration rates for bikes, cars, trucks, and buses have been well researched and documented, so these input parameters are defined within the code and remain constant. Other aspects of the traffic environment include traffic signals as well as the number of bus stops, pedestrian crossings, and parking zones. Pedestrian hourly volumes and bus inter-arrival times are examples of the influences of other users of the system.

The second main component of BICSIM is the initialization phase. First, all of the statistical counters that will be used to measure the effectiveness of the system must be set to zero. During the input process, the user must specify the length of the total simulation time as well as a fill-time. The fill-time is a warm-up period that loads vehicles onto the network in order to make the statistics more realistic. In this time, the arrivals of the first bicycles, motor vehicles, buses, and pedestrians are generated. BICSIM uses the negative exponential distribution to model random bicycle arrivals and the shifted negative exponential distribution to generate motor vehicle arrivals.

The core algorithm for BICSIM is contained in the simulation component of the program. All simulation models are built around a time-scanning principle. In this model, the fixed-increment time advance method is used. The code contains a variable that acts as the simulation clock, and this clock is advanced by some small, prescribed time interval (DT). Then, the program scans the functions in the code to determine if any events have occurred in that small period of time and updates the system statistics accordingly. It is important that the components of the traffic system that are least affected by others be scanned first. The author has written the program to scan in the order of traffic signals, parking activity, pedestrians, and then vehicles. Simple functions examine the changes in signal phases, the duration of parking maneuvers, and the decisions of pedestrians to cross a road, for each link. Most of the simulation code deals with the vehicle scanning since the complex interactions between motor vehicles, bicycles, and the traffic environment are the most difficult to model.

During the vehicles' travel along the network, they interact with many obstacles that may force a change in speed. These obstacles include traffic signals, pedestrians, and parking vehicles as well as other motor vehicles and bicycles. Specifically, present invention examines the longitudinal and lateral interactions of bicycles and motor vehicles with one another. There are three classifications for the longitudinal behavior of vehicles: unimpeded, following, or maneuvering (lane changing). In BICSIM, the situation may arise where a car follows a bicycle or a bicycle follows a car.

Before this detailed analysis is undertaken, the final component of this simulation program, which is the output calculation, should be discussed briefly. The purpose of any simulation program is to provide the user with some measurements of effectiveness (MOE) of the system in order to understand the behavior of the network and assist in future decisions. Statistical counters throughout the code provide many of these MOE's. Here are a few examples of those contained in BICSIM. The number of vehicles of each type is totaled over the entire network and for each link. Average travel time, speed, and delay per vehicle are also measured over the network and for each link. BICSIM also examines environmental impacts by calculating the aggregate fuel consumption over the entire network and for each link. No MOE's are provided for buses and pedestrians because BICSIM only wishes to consider their effect on the performance of motor vehicles and bicycles.

There is one measure of effectiveness that should be discussed in greater detail, which involves the lateral interactions of bicycles and motor vehicles. Statistics have shown that most accidents involving motor vehicles and bicycles occur at intersections. As a measure of safety, BICSIM contains counters that total the number of lateral encounters that may lead to a potentially dangerous situation. When a motor vehicle must slow down or yield to a bicycle at an intersection, a variable called bikesmet is incremented. Similarly, a bicycle yielding to a motor vehicle would increment the carsmet variable. If a motor vehicle cannot change lanes due to an insufficient gap caused by a bicycle, then the counter bikescrossed is incremented. The reverse situation follows for carscrossed. In general, the lateral movements of the vehicles are not modeled unless a lane change is taking place. Some may argue that the presence of bicycles in the traffic flow force drivers to shift laterally in the lane, and sometimes into the next lane, to leave a wider space cushion. This in turn has an adverse effect on vehicle speeds, a result that is accounted for in the model. However, in an urban transportation system, most bicyclists will be experienced riders and drivers will not feel the need to overcompensate in their presence. Thus, the only lateral movements that are modeled in BICSIM are lane changes and total encounters.

Now that the main components of BICSIM have been summarized, the focus will shift to a more detailed analysis of the longitudinal and lateral interactions between bicycles and motor vehicles, as modeled in this program. As early at the 1950's, researchers began developing theories to describe the behavior of vehicles as they follow one another. The most extensive studies were performed by a group of researchers associated with General Motors. They developed five generations of car-following models based on the common sense relationship:

Drive response=sensitivity*stimulus

In car-following situations, it was observed that the response of a driver seemed to be affected by the relative speed of his car and the one ahead. Thus, the relative speed corresponds to the stimulus in the function. Initially, the sensitivity factor was assumed to be constant, but further studies suggested that driver sensitivity is inversely proportional to the distance headway. The following equation is the third generation model for the General Motors car-following theory:

$$\ddot{x}_{n+1}(t+\Delta t) = \frac{\alpha_0}{x_n(t) - x_{n+1}(t)}[\dot{x}_n(t) - \dot{x}_{n+1}(t)]$$

where

| | | | |
|---|---|---|---|
| $\ddot{\chi}_{n+1}$ = | acceleration/deceleration rate of the following vehicle (ft/s$^2$) | | |
| $\alpha_0$ = | sensitivity constant | $\Delta t$ = | reaction time |
| $x_n$ = | position of lead vehicle (ft) | $x_{n+1}$ = | position of following vehicle (ft) |
| $\dot{\chi}_n$ = | speed of lead vehicle (ft/s) | $\dot{\chi}_{n+1}$ = | speed of following vehicle (ft/s) |

This is the model that was chosen to be implemented in BICSIM for car-following situations. One of the reasons that the General Motors models are so widely accepted is because the researchers conducted an extensive data collection effort to support their theories. Through a series of controlled experiments on a test track, they were able to obtain values for the sensitivity and reaction time parameters. These values, $\alpha_0$=40.3 ft/s and $\Delta t$=1.5 s are defined in the BICSIM program. The only way to change the values of these parameters is to physically alter the C++ code.

Years of research have been dedicated to car-following theory, but this model is not accurate for situations in which a car follows a bicycle, a bicycle follows a car, or a bicycle follows another bicycle. Obviously, cars and bicycles are motor vehicles with very different characteristics and capabilities. Thus, the present inventor decided that the General Motors model would not be suitable for mixed motor vehicle and bicycle following situations. It was thus necessary to develop a new vehicle following theory to incorporate into BICSIM. Clearly, an equation very similar to the General Motors model, based on relative velocities as well as vehicle spacing, would be best suited. However, further controlled experimentation would be necessary to adjust the sensitivity parameter in order to account for bicycles in the traffic flow.

The bicycle following logic of BICSIM is based on a combination of safety-distance models. The Total Safety Distance Model is based on the requirements that the distance between two vehicles be sufficiently large so that the following vehicle has enough time to stop, without causing a rear-end collision, when the lead vehicle suddenly stops instantaneously. This required distance consists of the length of the lead vehicle, the distance traveled during the perception-reaction time, the braking distance of the following vehicle, and a reserve safety distance. The reserve safety distance is the buffer distance between two stopped vehicles. The Total Safety Distance Model is expressed by the following equation:

$$\Delta x = L_n + L_r + b_{n+1} + L_s$$

where

Δx=distance headway (ft)

$L_n$=length of lead vehicle (ft)

$L_r$=distance traveled during reaction time (ft)

$B_{n+1}$=braking distance of the following vehicle (ft)

$L_s$=reserve safety distance (ft)

Since the vehicle's speed is nearly constant during the reaction time, then the distance traveled during reaction time can be computed by $L_r=\Delta t \cdot v$, where Δt is the reaction time and v is the velocity or speed of the following vehicle.

The Total Safety Distance Model was based on the assumption that the lead vehicle stops instantaneously. This does not happen in reality. Instead, the lead vehicle requires some braking distance as well. If two vehicles are in following mode, then they are traveling at nearly the same speed. Thus, the distances required for braking are almost equal, and the following vehicle only needs the distance it covered during the reaction time. This is called the Reaction Time Distance Model, which is represented by:

$$\Delta x=L_n+L_r+L_s$$

where all the variables carry the same meaning as described before. This equation eliminates the braking distance from the Total Safety Distance Model so that the distance headway depends only on the varying reaction time (the other variables are constant).

Since bicycles and cars are vehicles with very different braking capabilities, then the assumption that the braking distances of the lead and following vehicles are equal is unrealistic. Thus, the braking distances should not be eliminated, as in the Reaction Time Distance Model. However, including the entire braking distance of the following vehicle, as in the Total Safety Distance Model, would overestimate the required distance headway. Therefore, the total distance needed for braking should be modeled as the difference in braking distances for the lead and following vehicles. The resulting equation is:

$$\Delta x=L_n+L_r+[b_{n+1}-b_n]+L_s$$

where $b_{n+1}$ is the braking distance of the following vehicle and $b_n$ is the braking distance of the lead vehicle. This model logically suggests that when the braking distance of the lead vehicle is greater, then the second vehicle can follow more closely. This equation, though different in notation, appears in the *ITE Traffic Engineering Handbook.*

There is one other significant difference between the bicycles and motor vehicles that needs to be incorporated into the model. Due to the lateral flexibility of the bicycle, it can stop with its wheels on the side of the lead vehicle. Thus, the reserve safety distance would not be necessary. This term can be eliminated from the previous model, and the result becomes:

$$\Delta x=L_n+L_r+[b_{n+1}-b_n]$$

This is the final equation used in BICSIM to model mixed motor vehicle and bicycle following theory.

Now, a more critical examination of this mixed following theory and its implementation in the code is offered. First, the elimination of the reserve safety distance from the above equation cannot be substantiated. What if the situation involves a car following a bicycle? The car does not possess that same lateral maneuverability as a bicycle, so that buffer distance is quite necessary. In fact, most drivers have a tendency to exceed their usual spacing requirements when bicycles are within close proximity. The reserve safety distance should not be neglected when a bicycle is following a car. Though the bicycle does have the flexibility to stop with the is wheels to the side of the lead vehicle, no bicyclist would actually do this outside an emergency situation. The reserve safety distance is defined to be the buffer distance between two stopped vehicles. In a normal stoppage, say at a traffic light, a bicyclist would certainly maintain some distance behind the vehicle in front.

Other inconsistencies in the implementation of this mixed vehicle following theory were detected. The first problem lies within the function calls for the different following theories. The following is a sample from the actual BICSIM code:

```
If(z != 0)
{
    switch (link[x].lane[y].vehicle[z].type)
    {
        case bike:
            followspeed=bikefollowing(x,y,z);
        break;
        default:
            followspeed=carfollowing(x,y,z):
        break;
    }
}
```

The switch statement in C++ acts just like a conditional. If the vehicle type is a bike, then call it the bike-following theory. If the vehicle type is a car, then call it the car-following theory. In the first case, the function will apply the mixed vehicle following equation, which was just derived from the safety distance models, to the current bicycle and the vehicle in front of it, whether the lead vehicle is a car or another bicycle. This certainly makes sense, but in the latter case, this logic is faulty. This function will apply the General Motors model to the current car and the vehicle in front of it, whether the lead vehicle is a bicycle or another car. The General Motors model does not accurately describe the situation in which a car is following a bicycle. Drivers will have a different sensitivity factor when behind a bicycle, so this situation would require an adjustment of these parameters.

This problem can be easily solved by making a slight change in the code. Within the case in which the car-following theory is called, a statement should be added that conditions on the type of the previous vehicle. If the current vehicle is a car and the lead vehicle is a bicycle, then bike-following is called. If the current vehicle and the lead vehicle are cars, then call the car-following function. Here is how the code would be updated:

```
if(z != 0)
  {
switch (link[x].lane[y].vehicle[z].type)
{
    case bike:
        followspeed=bikefollowing(x,y,z);
    break;
    default:
        if (link[x].lane[y].vehicle[z-1].type == bike)
            {
                followspeed=bikefollowing(x,y,z);
            }
        else
            {
                followspeed=carfollowing(x,y,z);
```

-continued

```
            }
          break;
        }
    }
```

It would also be helpful to take a closer look at the bike-following theory function in the code. There do not appear to be any fallacies in this part of the program, but some changes can be made to improve efficiency. The following excerpt from the BICSIM code contains the calculations that are necessary to apply the mixed motor vehicle and bicycle following model that was specifically developed for this simulation:

$$d = \frac{v^2}{2a}$$

d=distance (ft)

v=velocity (ft/s)

a=acceleration/deceleration rate (ft/$S^2$)

For this particular program, this equation would be coded in the following way:

```
deceldistance=(speed*speed)/(2*deceleration);
```

This seems much more succinct, and it eliminates the need to calculate the deceltime. The same approach can be applied for the leaddeceldistance.

```
float bikefollowing (int x, int y, int z) //BICYCLE FOLLOWING
    {
    ofstream output("c:\\UD_Th\\Input\\output.dat",ios::app);
        float resultspeedz=link[x].lane[y].vehicle[z].vcurrent;
        float length=link[x].lane[y].vehicle[z-1].length;
        float speed=link[x].lane[y].vehicle[z].vcurrent;
        float reactdistance=speed * RT;
        float deceleration=link[x].lane[y].vehicle[z].decel;
        float deceltime=speed/deceleration;
        float deceldistance=speed*deceltime+0.5*decelation*deceltime*deceltime;
        float leadspeed =link[x].lane[y].vehicle[z-1].vprevious;
        float leaddecel=link[x].lane[y].vehicle[z-1].decel;
        float leaddeceltime=leadspeed/leaddecel;
        float leaddeceldistance =
            leadspeed*leaddeceltime+0.5*leaddecel*leaddeceltime*leaddeceltime;
float followdistance=length+reactdistance+deceldistance+leaddeceldistance;
float distance=link[x].lane[y].vehicle[z=1].previousposition -
    link[x].lane[y].vehicle[z].position;
float reactcounter=link[x].lane[y].vehicle[z]reactcount;
```

First, the bold-faced line near the bottom of the code represents the combined safety distance model that was developed for mixed motor vehicle and bicycle following situation. Here is the actual equation for comparison:

$$\Delta x = L_n + L_r + [b_{n+1} - b_n]$$

$l_n$=length of lead vehicle (ft)

$L_r$=distance traveled during reaction time (ft)

$b_{n+1}$=braking distance of following vehicle (ft)

$b_n$=braking distance of lead vehicle (ft)

The variables deceldistance and leaddeceldistance represent the braking distances of the following and lead vehicles. Since the braking distances for both cars are calculated the same way, just consider the braking distance (deceldistance) of the following car. The calculation for this variable has also been bold-faced in the code sample. It uses the basic equation for motion:

$$d = v_0 t + \frac{1}{2} a t^2$$

d=distance (ft)

$v_0$=velocity (ft/s)

a=acceleration/decelration rate (ft/$s^2$)

To apply this equation, it was also necessary to calculate the deceltime, which is computed in the line above deceldistance. In the *ITE Handbook*, braking distances are computed by the following equation:

One other point about this particular piece of the code is worth noting. Recall that the distance traveled during reaction time is calculated by $L_r = \Delta t \cdot v$, where $\Delta t$ is the reaction time and v is the velocity of the vehicle. The reaction time is a defined parameter in BICSIM. The General Motors researchers determined the average reaction time to be 1.5 seconds while conducting controlled experiments on their car-following theories. This parameter is related to to driver perception, and is not dependent on vehicle type. Thus, $\Delta t = 1.5$ is used for calculations in the bicycle following theory as well. This is seen in the statement:

```
Reactdistance=speed*RT;
```

where the reaction time RT=1.5 was defined in the opening declarations of the program code.

A. Input Entry

The input data are read from text files in the following order: initialization data, entry-node data, traffic control and other link data, pedestrian and on-street parking data. The initialization input contains general information such as the number of links and entry-exit nodes on the network, and the length of simulation and initialization time. Then specific data for each entry node and link are read.

The user enters the motor vehicle and bicycle hourly volumes for each entry node, which the program automatically converts into inter-arrival times in seconds. The ratio of trucks is also specified by the user. Each bus-line entering the network at a specific entry node is defined by the headway between its buses, the time when the first bus enters the network relative to the simulation start time, the route (collection of links), and the time the buses spend in the bus stops. It is assumed that each bus stops at each bus stop on its route.

The location of the link is determined by its relative position to other links. The user identifies the links receiving right turning, left turning, and through vehicles, as well as the links producing vehicles from the left, from the right, and opposing vehicles at the downstream node of any particular link. The turning ratios at the downstream links are defined for both bicycles and motor vehicles. Links can be shared by motor vehicles and bicycles, or be multi-use paths shared by bicycles and pedestrians. The user also defines the length and width of the links, the grade, speed limit, number of lanes, and the length of left- and right-turn pockets. The channelization of each lane is defined here. The possible channelization types are non-channelized, through-only, through-and-right, through-and-left, right-only, left-only, right-pocket, and left-pocket.

In addition the lanes can be defined as bike-only or shared. In order to properly model the lateral interaction of bicycles and motor vehicles it is advised that wide (14 feet) shared lanes be modeled as two lanes (one shared and one bicycle lane). This is due to the fact that on wide lanes these two types of vehicles behave the same way as if they would be separated by a line designating the bicycle lane. This fact would cause the need to model narrow and wide shared lanes in different ways. By allowing the user to model wide lanes as consisting of a shared and a bicycle lane not only the model is simplified (saving memory and CPU time), but more flexibility is provided to the user, since they can observe the behavior of vehicles in particular locations and model it accordingly.

The number of bus stops, pedestrian crossings and parking zones on the link is also entered. For each pedestrian crossing the hourly volume of pedestrians, and the number of people crossing abreast is required. The walking speed of pedestrians is already specified in the program, and can be changed only by entering the code. In the case of signalized crossings the length and signal indication during the phases is determined. On multi-use paths the user needs to enter only the hourly volume of pedestrians.

Parking zones can be defined on both sides of the link. It is the user's responsibility to make sure that no parking zones are entered for the left side of links which model two-way streets. Each parking zone is characterized by its location (in feet from upstream end of link), its length, the number of parking maneuvers per hour, and the duration of parking maneuvers.

The type of traffic control for each link can be defined as signalized, major, stop, and yield. For signal controlled links the length and signal indication of each phase is entered by the user. The possible signal indications are: green with permitted or protected left turn, only through green, through and right green, through and left green (protected or permitted), amber, red, red with right turn permitted, red with left turn permitted, green right with left turn permitted, green right with left turn protected, right green, left green, and left green with right turn permitted.

All input data are in U.S. standard units. After reading them the program stores the information in record structures and passes them to the components described below.

B. Initialization and Vehicle Generation

In order to start the simulation the global variables must be assigned some initial values. The simulation clock and all the other counters must be set to zero. The traffic signals are set to their first phases. The arrival of first motor vehicles, bicycles and buses is generated for each entry node, the arrival of first pedestrians is generated on the crossings and on paths, and the first parking maneuvers are also generated. This process is shown on FIG. 4.

In a microscopic arrival process individual vehicles are generated according to the traffic volume. The traffic volume determines the average time headway between successive vehicles. With low traffic volumes the negative exponential distribution is sufficient and is most commonly used to model motor vehicle traffic. With higher traffic volumes most of the vehicles are following other vehicles, thus combined distribution is needed to define the portion of free vehicles and queuing vehicles. BICSIM uses a shifted negative exponential distribution to model motor vehicle arrivals. The distribution is shifted to avoid too short headways. The shift is 0.5 seconds, because it was observed that individual headways are rarely less than 0.5 seconds. Under non-signalized conditions this value could be 0.75 seconds, but the presence of signal lowers this value reflecting the lower discharge headways. Thus, the probability of time headways less than 0.5 seconds is assumed to be zero. A negative exponential distribution was also used to model arrival of bicycles, as recommended by. This distribution was found to be the most suitable to model low to medium bicycle volumes, what is usually the case in the United States. No shift was introduced to bicycle arrival modeling, because there is a possibility of bicyclists traveling abreast or in groups.

Pedestrians and parking cars are also assumed to arrive according to Poisson distribution.

The distribution of the parking maneuvers is assumed to be uniform over the length of the parking zone, actual parking spaces are not taken into consideration. Buses arrive according to a user-defined schedule, with deterministic headways.

C. Simulation

Figure 5:
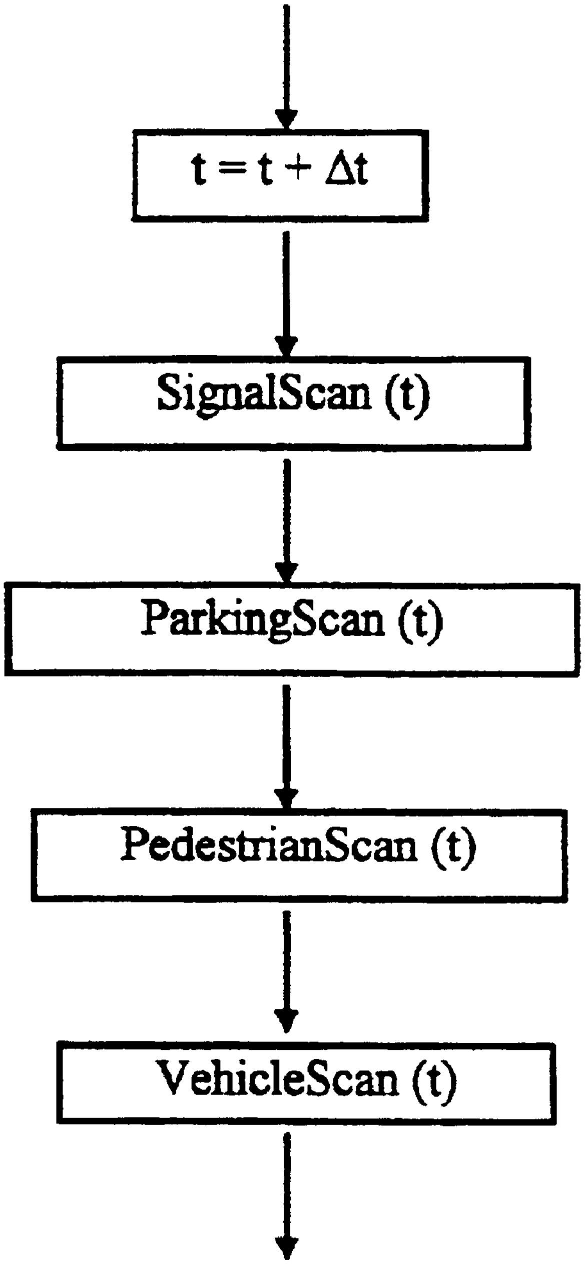

As described earlier, BICSIM uses a time-interval scanning approach to update the state of the system. The function simulation updates the simulation clock by DT (length of scanning time period), and while it does not exceed the user-defined simulation time the components of the system are scanned. When using this method one of the biggest decisions is to decide in which order to scan the components. In order to get a more realistic model the components that are affected the least by the other components of the system should be scanned first. As shown in FIG. 5, BICSIM first scans all the traffic signals over the entire network, then updates the parking activity and pedestrians, and at last all the vehicles.

The order of links scanned is determined by the order they are entered by the user. Thus good data entry assures that downstream links are scanned before upstream links. Based on this rule, exit links are scanned first and entry links last.

D. Signal Scanning

Figure 6:
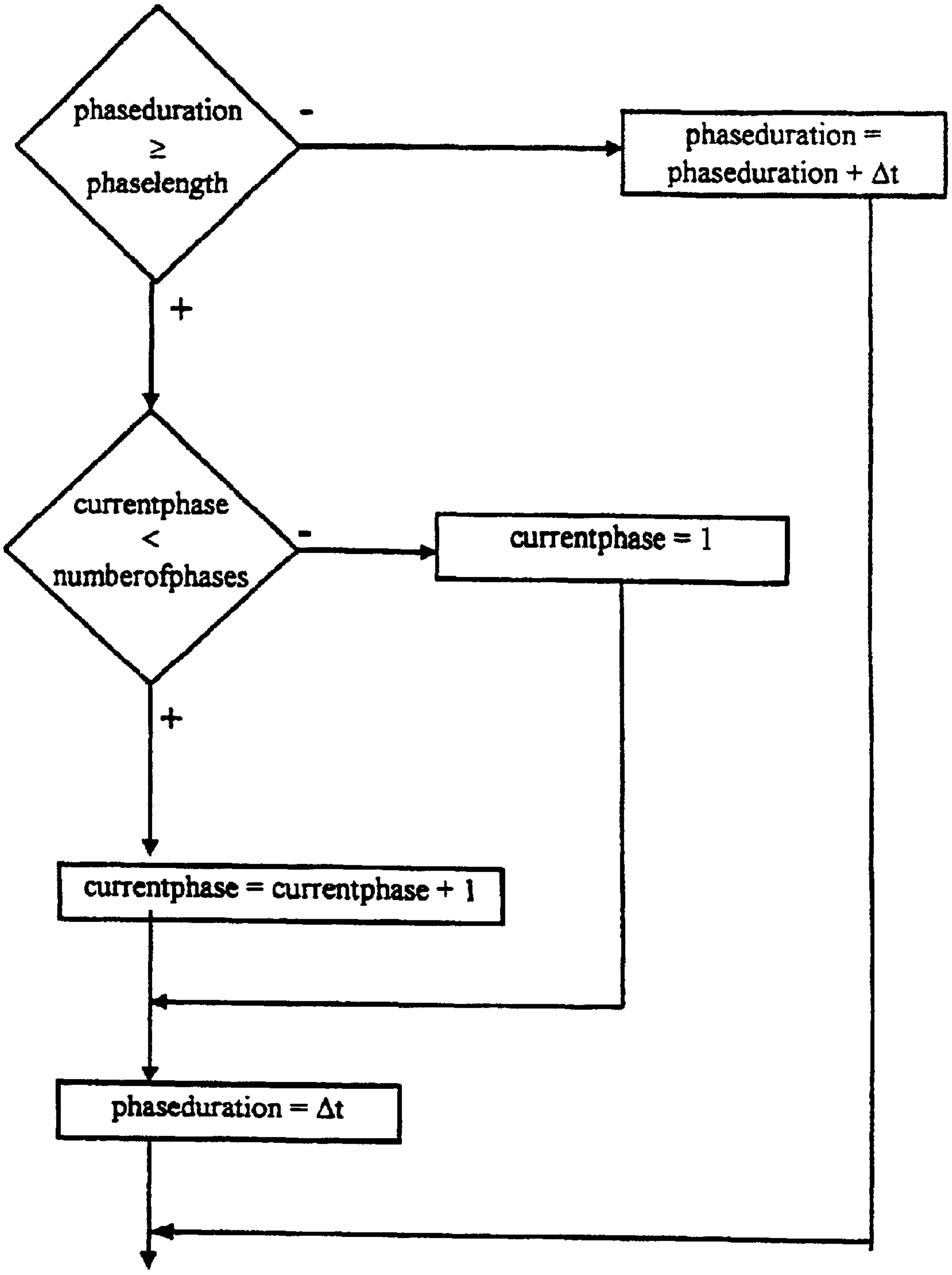

Each pretimed traffic signal is scanned every time period. A variable called phaseduration is incremented for the current phase by the value of DT (length of scanning interval). Then phaseduration achieves the length of the phase defined by the user, the signal indication changes to the next phase. This algorithm is shown in FIG. 6. The possible signal indications are described below.

E. Parking Activity Scanning

Figure 7A:
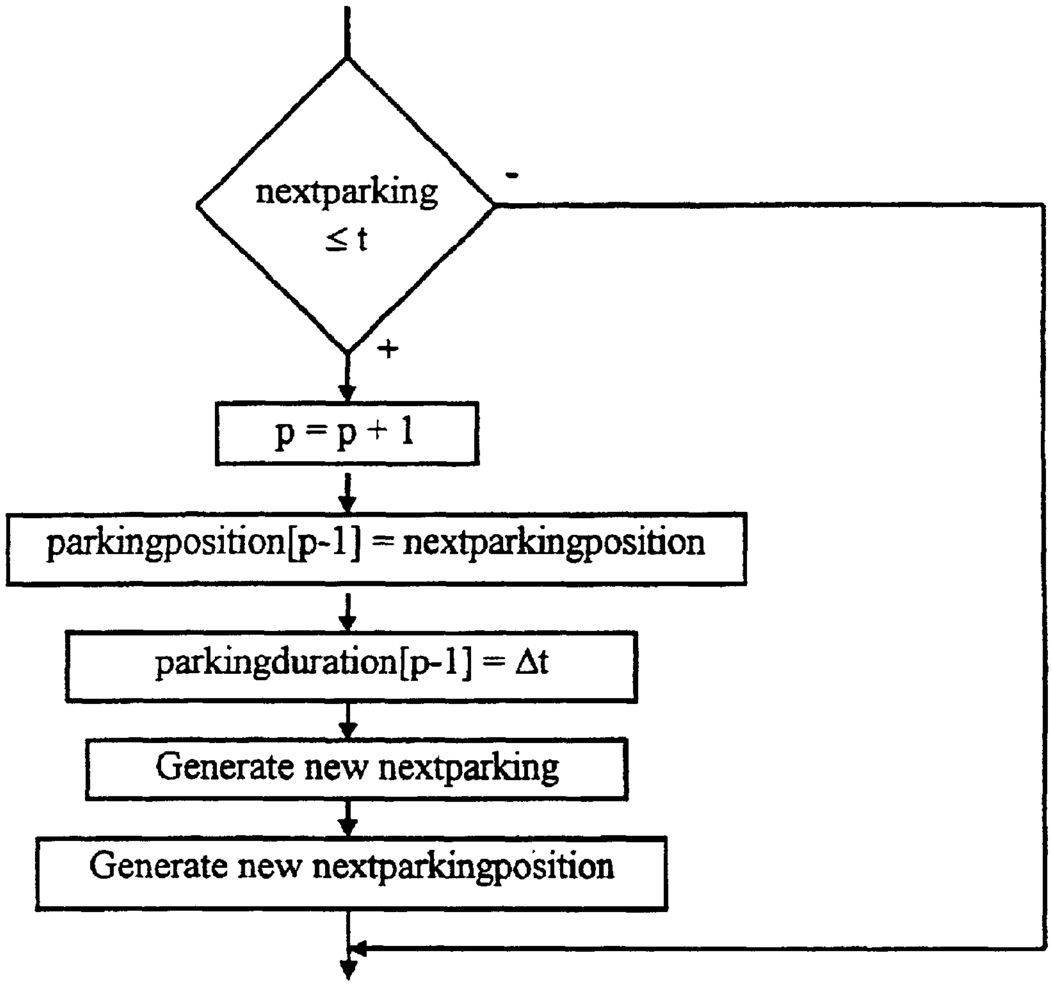
Figure 7B:
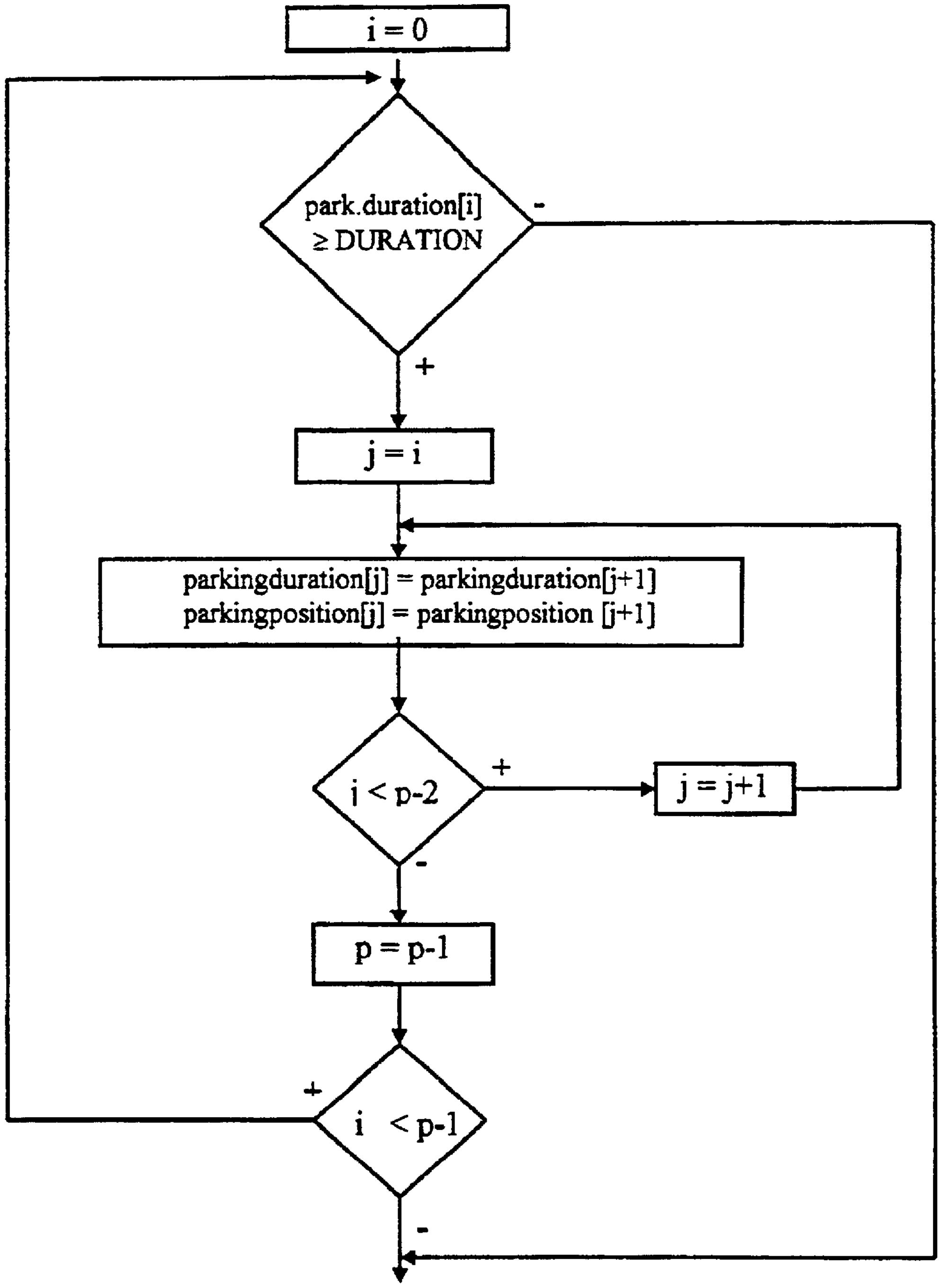
Figure 7C:
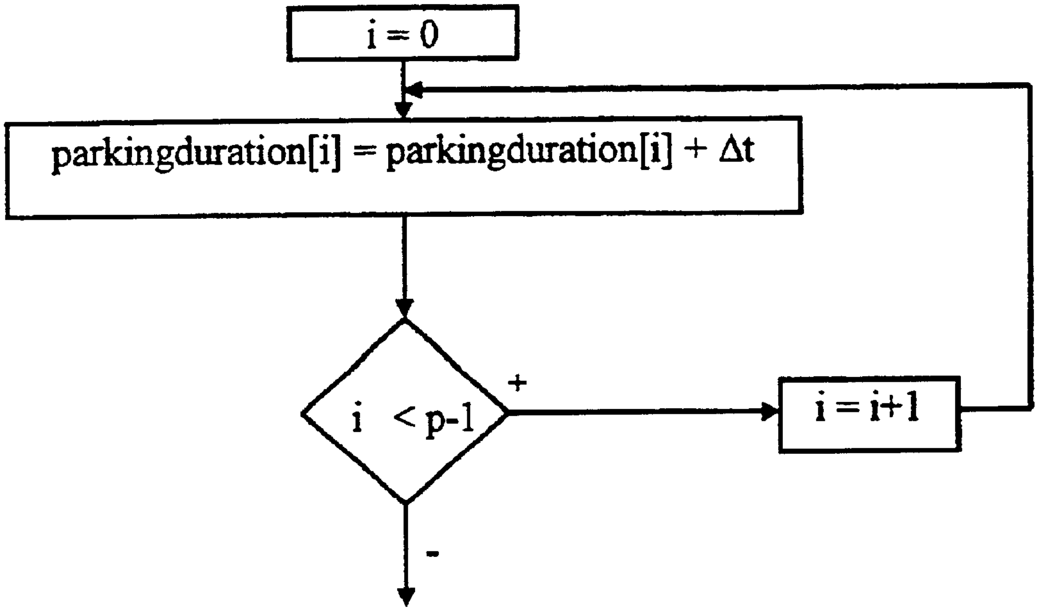

The parking zones on both right and left (if they exist) sides of the links are scanned by a function called parkingscan. By calling its sub-functions, this function checks whether any parking maneuver was generated for the current time period, it updates the duration of all the maneuvers, and terminates the maneuvers which achieved a specified duration time. FIGS. 7A, 7B, and 7C show the flowchart of this procedure. FIG. 7A shows the steps for determining new parking maneuvers. FIG. 7B shows the steps for checking whether parking maneuvers are finished. FIG. 7C shows the steps for updating the duration of parking maneuvers.

F. Pedestrian Scanning

Each pedestrian crossing and multi-use path is scanned by this function. For the crossings, the function checks whether a pedestrian arrival occurs at the current time period. If a pedestrian arrives at the current time period, the program increments by one the number of pedestrians planning to cross the link and generates the next arrival. Then the program checks whether the pedestrians already on the crossing (if any) reached the other side of the link, and sets the occupied flag accordingly. In case of signalized crossings the pedestrian signal is updated in a similar manner as described previously.

The most significant part of pedestrian scanning is that the decision must be made whether the pedestrians waiting to cross can proceed. In the case of unsignalized crossings, if there are no pedestrians currently on the crossing (occupied=0) the program first checks whether there are any vehicles upstream from the crossing within "safe distance." Safe distance is defined as the braking distance of the vehicle plus the distance traveled during reaction time. If no vehicle is within this distance the pedestrians start to cross, the crossing is "occupied." The crossing time is calculated as follows: [width (length of crossing)/walking speed]+[(number of pedestrians/number crossing abreast)−1]*headway.

The number of pedestrians crossing abreast depends on the width of the crossing, and is specified by the user. The average time headway between pedestrians has been shown to be 2 seconds. The crossing speed of pedestrians is usually in the range 2 to 4 mph (miles per hour), which is also called functional speed. The value most often used for calculations is 4 feet per second. This latter walking speed is used by BICSIM. If the crossing is already occupied when a pedestrian arrives, the program assumes that it is safe to cross, because the upstream vehicles already had to slow down or stop reacting to the pedestrians on the crossing. This is made possible by the assumption that the position of pedestrians on the crossing does not have any affect on which vehicles must stop. The vehicles in each lane react the same way, regardless of the position of the pedestrians on the crossing.

If the crossing is already occupied, two situations can arise, with different crossing time calculations. If the pedestrians already on the crossing are within the distance headway from the start of the crossing, then the newly arrived pedestrian waits until there is a sufficient headway and then starts to cross. Thus the aggregated crossing time will be longer by 2 seconds. On the other hand, if the pedestrians are farther than the distance headway, the new pedestrian can start the crossing immediately, and the remaining crossing time will be equal to his/her crossing time, or in other words the width of the link divided by his/her walking speed.

Figure 8A:
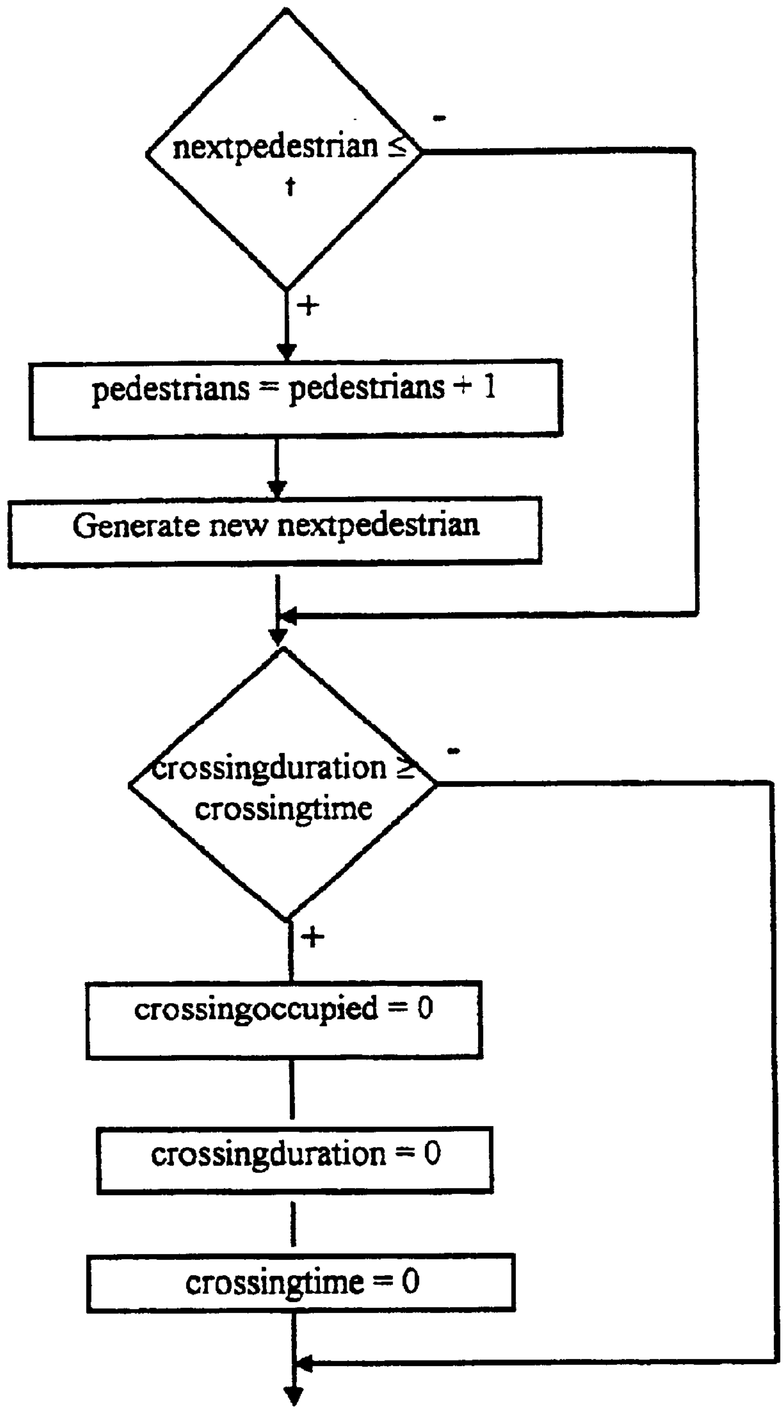
Figure 8B:
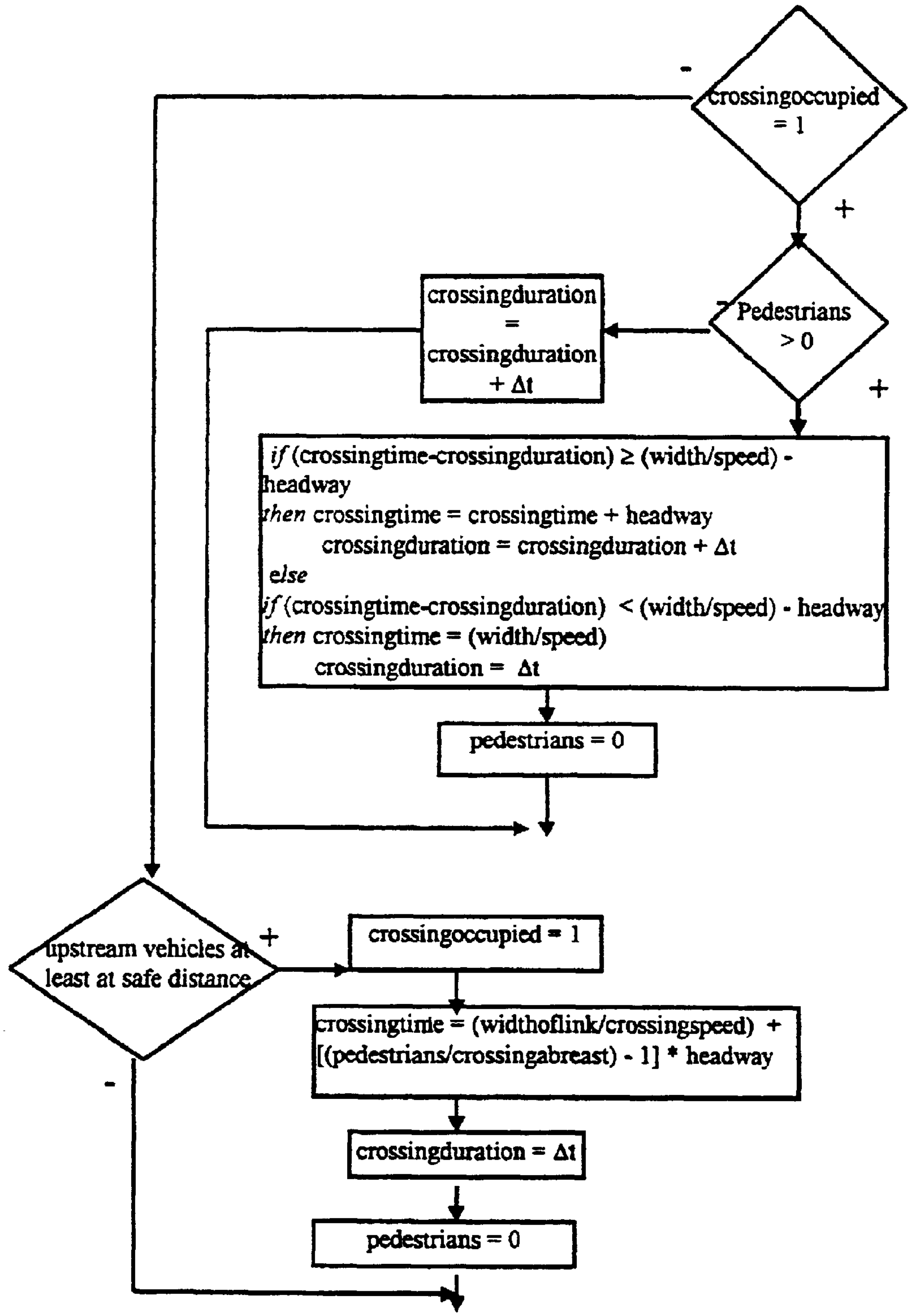
Figure 8C:
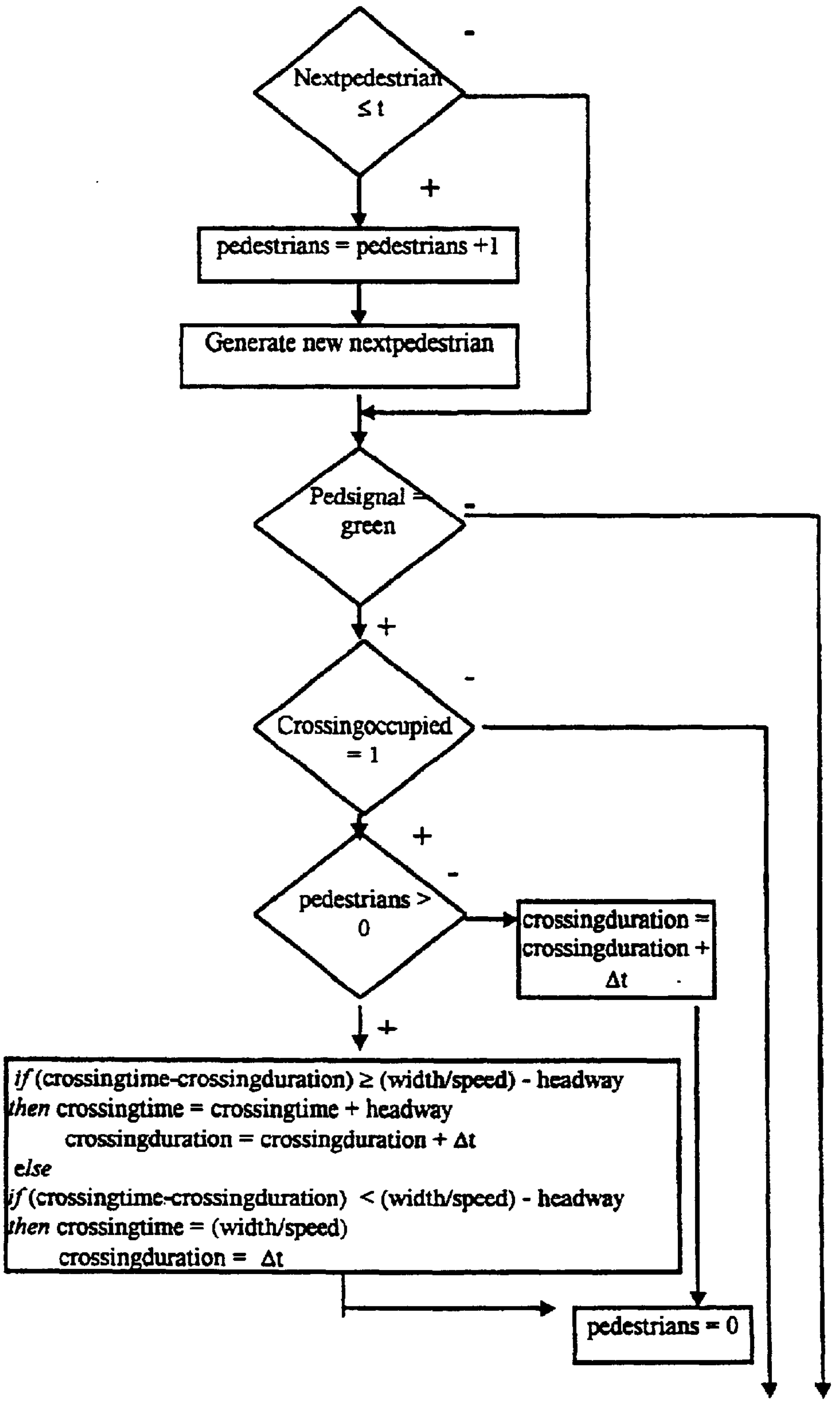
Figure 8D:
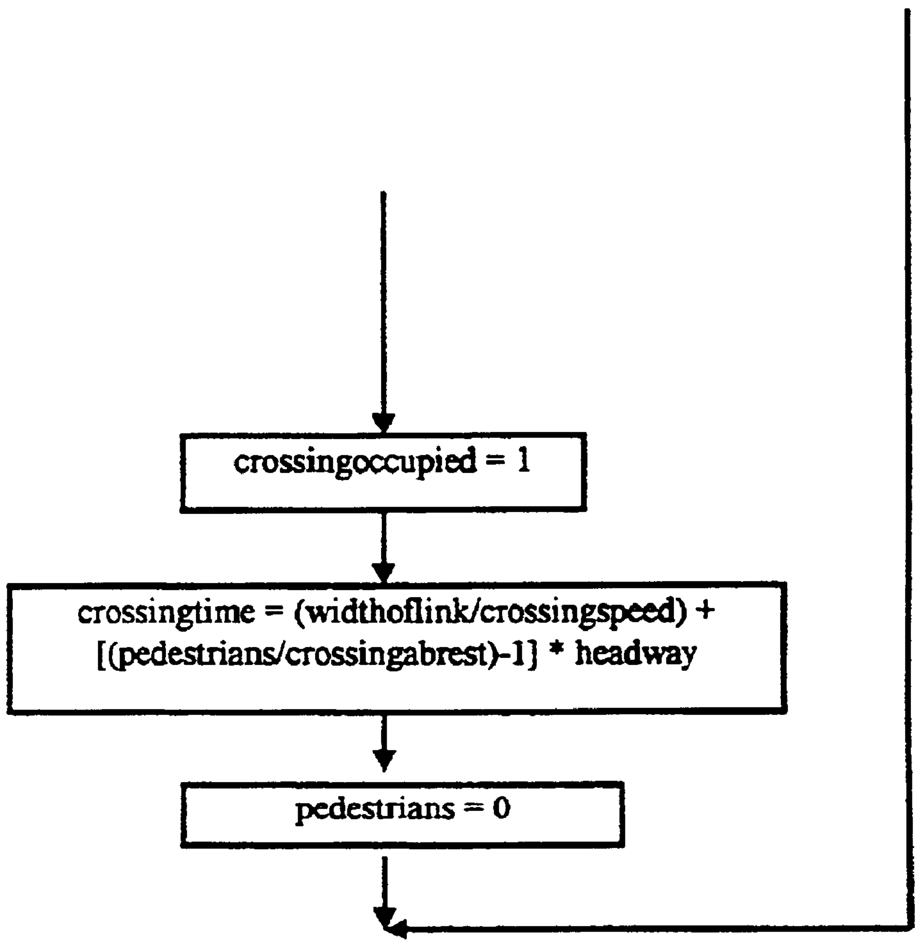

In the case of signalized crossings, pedestrians do not have to check for cars. Their crossing time is calculated in the same manner as for the unsignalized crossings, which provides information on the occupancy of the crossing. Turning motor vehicles and bicycles can thus react accordingly. The flowchart of pedestrians unsignalized crossing scanning is shown in FIGS. 8A and 8B, and of signalized crossings in FIGS. 8C and 8D. FIG. 8A shows the steps for the arrival of new pedestrian and for the checking of whether the crossing was finished during the previous time period. FIG. 8B shows the steps of checking to see if the crossing is occupied and having the cross too, and of checking whether it is safe to cross. FIGS. 8C and 8D shows the steps involved in signalized crossings pedestrian scanning.

On paths, shared by bicyclists and pedestrians, pedestrians arrive according to a Poisson distribution. An array stores the time required for each pedestrian to clear the path. This time is calculated as the length of the path divided by the walking speed. The walking speed on the path is assumed to be the same as on the crossing, 4 feet per second.

Pedestrians on the path are included in the model to account for their effect on the speed of the bicyclists. Thus the pedestrians' interaction with the bicyclists is not modeled microscopically, but rather on an aggregate basis, taking into consideration the space these pedestrians occupy at any given time period.

For the purpose of this model the rules developed for sidewalks by P. H. Wright in *Highway Engineering* (John Wiley & Sons 1996), were used, the disclosure of which being herein incorporated by reference. These rules determine the effect of space on the freedom of movement and walking speed. One of the differences between Wright's model and model of the present invention is that while Wright recommends that the effective width should be reduced by 2 feet or more to account for the constricting effects of mailboxes, fire hydrants, and other street furniture, this is not the case with paths. Thus the whole width of the path is used to determine the available space. The available space is obtained by multiplying the width of the link by its length. This space is then divided by the number of pedestrians on the link at the given time. According to Wright, if the space per person is greater than 530 feet it means complete freedom to select speed and direction of movement. This implies that the speeds of bicyclists are not affected by the pedestrians. They could travel at their desire speed, or at the speed allowed by other bicyclists, grade, curvature and other factors. Between 530 and 130 feet$^2$ the flow is unimpeded, frequent indirect interaction with others occurs, and between 130 and 40 feet$^2$ it is impeded constant indirect interaction with others occurs. At this situation bicyclists typically travel with a 5 mph speed on multi-use paths. They can still travel faster than pedestrians since they can overtake them, but can't travel too fast because of safety reasons.

In the constrained situation (40–24 feet$^2$), crossing and passing movements are possible but with interference and likely conflicts, and in crowded situation (24–16 feet$^2$), the probability of conflicts if fairly high and passing is difficult. In this situation bicycles travel at the speed of pedestrians, 4 feet per second. In a congested situation (16–11 feet$^2$), frequent body contacts and difficulty to walk at normal pace characterize the flow, and bicyclists travel at their minimum pace. At a jammed situation (11–2 feet$^2$), only shuffling movement is possible, and since bikes can not travel with this small speed (because of their balance) they have to shop. These data are used to adjust the speed of bicyclists.

G. Vehicle Scanning and Dynamics

Figure 9:
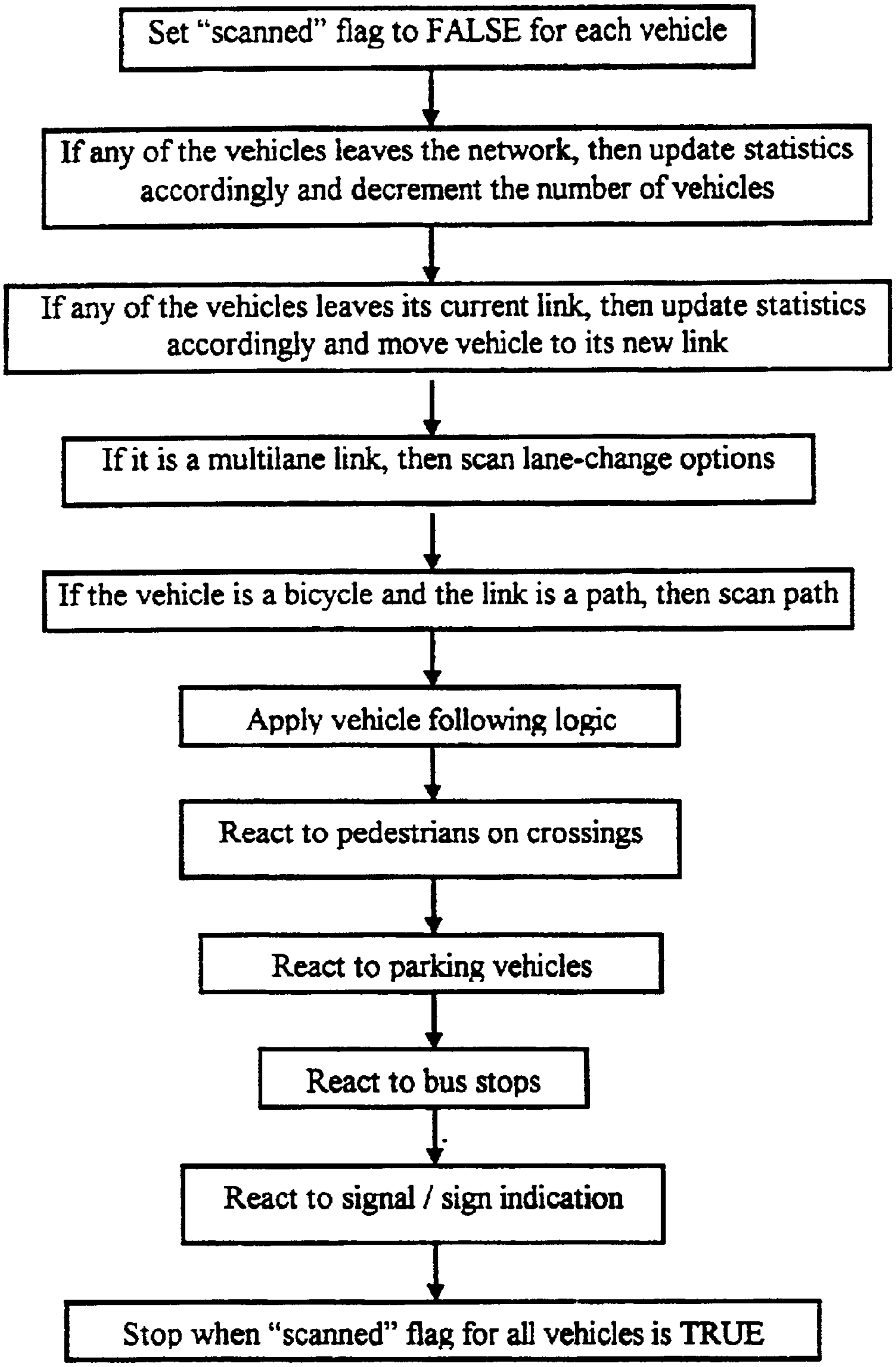

Vehicles, including motor vehicles and bicycles are scanned starting from the downstream end of links. This procedure is shown in FIG. 9. The generation of vehicles was already described previously. Once a motor vehicle or bicycle is generated, it starts traveling through the network until it reaches an exit point. During this travel it meets various obstacles that may force to restrict its speed. The potential obstacles are other motor vehicles and bicycles, traffic signals and signs, pedestrians, parking vehicles, and buses at bus stops. These interactions may force the vehicle to slow down or to stop. A proper lane must be selected and lane switching performed if necessary. In lane switching case the driver must observe the vehicles in the other lane and adjust its behavior according to the traffic situation.

The acceleration and deceleration rates of motor vehicles were adopted from the HUTSIM simulation model (see I. Kosonen, *HUTSIM—Simulation Tool For Traffic Signal Control Planning*, Helsinki University of Technology Transportation Engineering Publication 89 (1996); hereinafter "HUTSIM"). These rates are 5.3 ft/s$^2$ acceleration and 6.3 ft/s$^2$ deceleration for passenger cars, 3.9 ft/s$^2$ acceleration and 5.6 ft/s$^2$ deceleration for trucks, and 3.3 ft/s$^2$ acceleration and 4 ft/s$^2$ deceleration for buses. For bicycles these rates are 5 ft/s$^2$ acceleration and 9.6 ft/s$^2$ deceleration.

The acceleration (deceleration) rates of vehicles on each link are adjusted by the model based on a formula published in *Traffic Engineering Handbook* (Prentice-Hall, Inc. 1994):

$$a_G = a_L - \frac{Gg}{100} \quad (1)$$

where $a_G$=the maximum acceleration rate on grade (ft/sec$^2$)

$a_L$=the maximum acceleration rate on level terrain (ft/sec$^2$)

G=gradient (percent)

g=acceleration of gravity (32.2 ft/sec$^2$).

A similar formula was applied to deceleration rates:

$$d_G = d_L + \frac{Gg}{100} \quad (2)$$

where $d_G$=the maximum deceleration rate on grade (ft/sec$^2$)

$d_L$=the maximum deceleration rate on level terrain (ft/sec$^2$).

Two equations of motion are used to calculate the distance traveled and elapsed time during the acceleration (deceleration) of the vehicle. The time t required for the vehicle to accelerate (decelerate) at rate a from speed $v_{begin}$ to speed $v_{end}$ is calculated as:

$$t = \frac{v_{end} - v_{begin}}{a} \quad (3)$$

The distance d required for the same acceleration (deceleration) is calculated as:

$$=1.47\ v_{begin}t+0.733\ at^2 \quad (4)$$

where t is in seconds, the speed in miles per hour, and the acceleration in miles per hour per second. Because BICSIM works in feet and seconds, the parameters were converted to the corresponding values.

Longitudinal spacing of vehicles is particularly important in microscopic models due to the fact that movement of vehicles is affected not only by their characteristics and the environment, but also by the presence of other vehicles. This phenomenon is described by car following theory. In case of mixed traffic the situation becomes more complicated, because not only the car-car following most be considered, but also the situation where a bicycle is followed by a motor vehicle, a motor vehicle by a bicycle, or a bicycle by a bicycle. The following section discusses these scenarios. But before this discussion there are some basic terms, which should be defined. These are the distance and the time headway. Distance headway is the distance from a selected point on the lead vehicle (usually front bumper) to the same point on the following vehicle. Thus the distance headway includes the length of the lead vehicle and the gap between the two vehicles. Time headway is the time needed to travel the distance corresponding to the distance headway.

H. Motor Vehicle Following

The theory of car following is widely studied. Most of the theoretical work describing how motor vehicles follow each other was developed in the 1950s and 1960s. Today perhaps the most accurate and most widely used are the car-following theories developed by General Motors' (GM) researchers. Based on extensive field measurements they developed five generations of car-following theories, all of which were based on the assumption that the response is a function of stimuli adjusted by some sensitivity factor. The response is the acceleration (deceleration) of the following vehicle and the stimuli is the relative velocity of the lead and following vehicles. The difference between the five generations of the model is the representation of sensitivity. In the GM model the driver is assumed to react on proper stimulus after some reaction time, which is usually between 0.5 and 2.0 seconds.

The third GM model, which enabled the present inventor to discover a mathematical connection between the microscopic and macroscopic theories of traffic flow, was incorporated into BICSIM. This equation is the following form:

$$\ddot{x}_{n+1}(t+\Delta t) = \frac{\alpha_0}{x_n(t) - x_{n+1}(t)}[\dot{x}_n(t) - \dot{x}_{n+1}(t)] \quad (5)$$

where $x''_{n+1}$=acceleration (deceleration) rate of the following vehicle (ft/sec$^2$)

$x_n$=position of lead vehicle (ft)

$x_{n+1}$=position of following vehicle (ft)

$x'_n$=speed of the lead vehicle (ft/sec)

$x'_{n+1}$=speed of the following vehicle (ft/sec)

$\alpha_0$=sensitivity parameter $\Delta$t=reaction time.

These definitions are represented graphically in FIG. 10.

Because the sensitivity term in this model consists of a constant $\alpha_0$ and the distance headway, as the vehicles come closer together the sensitivity term becomes larger. The dimension of $\alpha_0$ is in feet per second, what made it possible to find the connection between this microscopic model and the Greenberg macroscopic model. Experiments conducted on the General Motors test track resulted in the values $\alpha_0$=40.3 feet per second, and the reaction time $\Delta$t=1.5 seconds. The third GM model was chosen because of its improved representation of the sensitivity term over the previous models, and its simplicity compared to the later models.

The above description applies to the car-car following situation. However, in BICSIM the scenario when the lead vehicle is a bicycle has to be considered. It was already mentioned that obtaining the sensitivity parameter for the model requires very extensive data collection, requiring controlled experiments on a test track or observation of real situations on a road network. It was assumed that the same parameter applies to the situation when car follows a bike.

I. Bicycle Following

It was discussed in the previous section how extensive work has been done to model car-following situations. In the case of bicycle following, the situation is quite different. Even after an extensive literature search covering not only the United States but other countries as well, there was no published research work found on this topic. This led to the need to develop a bicycle following model for BICSIM. The bicycle following logic of BICSIM is based on a simple theory, called the total safety distance model. This model was originally developed for motor vehicle following, and adjusted for the specific characteristics of bicyclists.

The total safety distance model is based on the safety requirement that the distance Ax between two vehicles should be sufficiently large to permit a vehicle to stop without causing rear-end collision if the lead vehicle comes to a stop instantaneously. Thus, the distance headway between the vehicles consists of the length of lead vehicle, the distance covered during the perception-reaction time, the minimum possible braking distance, and the reserve safety distance. The reserve safety distance is a buffer distance between stopped vehicles. FIG. 10 contains the graphical representation of these terms. The original model is as follows:

$$\Delta x = x_n(t+\Delta t) - x_{n+1}(t+\Delta t) = L_n + L_r + b_{n+1} + L_s \quad (6)$$

and $$L_r = \Delta t x_{n+1}(t) \quad (7)$$

where $\Delta$x=distance headway (ft)

$x_n$=position of lead vehicle (ft)

$x_{n+1}$=position of following vehicle (ft)

$L_n$=length of lead vehicle (ft)

$L_s$=reserve safety distance (ft)

$L_r$=distance traveled during reaction time (ft)

$\Delta t\ x'_{n+1}$=distance traveled by the following vehicle during reaction time At (ft)

$b_{n+1}$=braking distance of following vehicle (ft).

In reality the lead vehicle does not stop instantaneously, it needs a breaking distance to stop. If we assume that the lead and following vehicles travel at approximately same speed, their braking distances are nearly the same. Thus, the braking distance of the following vehicle does not need to be incorporated in the model. This is called the reaction time distance model.

In BICSIM an adjusted model based on the total and reaction time safety distance models was used. To assume that the speed of bicycles and motor vehicles as well as their deceleration rates are the same is not realistic, and the braking distance can not be eliminated from the equation. However, to include the whole braking distance would over-estimate the following distance. The following distance needed due to braking was thus modeled as the difference between the braking distances of the following and lead vehicles. This assumption implies that when the braking distance of the following vehicle is greater than the braking distance of the lead vehicle, the safe following distance increases. When the braking distance of the lead vehicle is greater, the following vehicle can follow more closely. The resulting formula is of the form:

$$\Delta x = L_n + L_r + [b_{n+1} - b_n] + L_s \quad (8)$$

where $b_n$=braking distance of lead vehicle (ft).

There is another significant difference between bicycles and motor vehicles, which is incorporated in the model. Because bicycles are more flexible laterally than motor vehicles, there is no need for the reserve safety distance in the equation. Bicycles can stop with their wheels on the side of the lead vehicle. The resulting equation of the distance headway is then:

$$\Delta x = L_n + L_r + [b_{n+1} - b_n] \quad (9)$$

J. Lane Changing Behavior

Lane changing can be categorized into two types, voluntary and forced lane changing. Forced lane switching occurs when the vehicle must change lanes in a certain area to reach its destination. This forced lane switching could occur, for example, when approaching an intersection and taking the appropriate lane for turning. In the case of voluntary lane change, the vehicle has a choice of staying in the current lane or changing lanes. This happens for example during overtaking.

Lane changing consists of two main parts, the decision and performing phases. In the case of forced lane switching the decision is already made, in the case of voluntary lane switching the traffic situation has to be evaluated in order to decide whether to change lanes or stay in the current one. During the performing phase the vehicle starts to seek a suitable gap in the next lane. In case of forced lane switching for motor vehicles, gap is searched until found, and the vehicle may be forced to stop in order to change lanes. With voluntary lane switching the decision can be canceled if no suitable gap is found.

When not forced the lane change is desirable when the vehicle's speed is less than its desired speed, and its speed is higher than the speed of the vehicle in front. It is checked by the algorithm whether there are suitable lanes on the right, on the left, or on both sides of the vehicle's current lane. Then the obstacle functions for all these lanes are compared.

The definition of obstacle function was adopted from HUTSIM and includes the speed difference as well as distance between the vehicle and the obstacle. Obstacle can be another vehicle traveling in front of the vehicle, parking cars, pedestrians, and other factors which do not allow the vehicle to travel with its desired speed and are lane specific. The obstacle function is calculated as the squared difference between the speed of the vehicle and the obstacle, divided by two times the distance between the vehicle and the obstacle.

The obstacle functions of the lanes are adjusted by a coefficient on the interval 0 to 1 in order to reflect the fact, that there must be at least some minimal amount of improvement after lane change in order to change lanes. The same concept is used to ensure that bicyclists will always tend to keep in the lanes more to the right. This is not applied for motor vehicles. In order to avoid too frequent lane switching a minimum time in lane is imposed. BICSIM uses a ten second minimum time in lane, which value was based on the HUTSIM model.

Lane switching is performed if the gap is at least 3 seconds. *TRAF-NETSIM User's Manual*, Federal Highway Administration (1989) uses 3.1 seconds and HUTSIM uses 2.4 seconds for voluntary, and 1.6 seconds for forced lane switch.

Lane choice is also important when a vehicle arrives to a new link. When a motor vehicle arrives to a link its next turning movement is generated, so if it is a multilane link the vehicle takes the lane which is most suitable for its next turn. The lane choice is also affected by the vehicular volume on that lane. When there are bus stops on the link, buses take the rightmost lane (unless it is a bicycle-only lane). If there are no stops buses behave like other motor vehicles. Bicyclists always take the rightmost lane when they arrive to a link.

K. Gap Acceptance

The critical gap is defined by the *Special Report* 209: *Highway Capacity Manual*, TRB (1985) as the median time headway between two successive vehicles in the major street traffic stream that is accepted by drivers in a subject movement that must cross and/or merge with the major street traffic flow. It is expressed in seconds. Tables 1 and 2 contain the accepted gaps used in BICSIM. These values are based on two sources, the *Highway Capacity Manual* and the research on gap acceptance criteria for bicyclists disclosed in T. C. Ferrara, "A Study of Two-Lane Intersections and Crossings Under Combined Motor Vehicle and Bicycle Demands," presented to the California Department of Transportation (Oct. 31, 1975).

L. Measures of Effectiveness/Model Outputs

The purpose of simulating a transportation network is to obtain information on its performance. BICSIM provides a number of Measures of Effectiveness (MOE) on a link-specific basis and aggregated over the entire network. These Measures of Effectiveness are calculated for both motor vehicles and bicycles, and summarized for all vehicles. Higher accuracy of the results is ensured by first running the program for a user-specified initialization time, also called "warm-up" or "fill-in" period, during which statistics are not gathered.

Perhaps the simplest output produced by BICSIM is the number of vehicles (bicycles, cars, all-vehicles) on each link as well as on the entire network. Whenever a bicycle or motor vehicle leaves a link, the appropriate counter (bicycles, cars, all-vehicles) is incremented by one. This counter, though, does not consider vehicles that are on the link at the time when the simulation finishes. Thus after achieving the simulation time all the links must be scanned and these vehicles added to the counters. The number of vehicles on the entire network can not be obtained by simply adding all the link counters, because this would lead to multiple consideration of the vehicles. The number of vehicles for the network is obtained in a similar manner as for the links.

Travel time (seconds) is the time taken by a vehicle to traverse a given segment of the network. In BICSIM the travel time is calculated when a vehicle leaves the link as the difference between the current simulation time and the time when the vehicle entered the link.

Delay is the time lost by a vehicle due to causes beyond the control of the driver. BICSIM calculates delay as the difference between the actual travel time and the travel time of a vehicle traversing the segment at its desire speed:

$$d = t_{tr} - \frac{s_{tr}}{v_{des}} \tag{10}$$

where d=vehicle delay $t_{tr}$=vehicle's actual travel time $s_{tr}$=vehicle's travel distance $v_{des}$=vehicle's desired speed level.

This definition allows only the calculation of delay in general, without specifying the reason for this delay.

Speed is the rate of movement of a vehicle in distance per unit time, travel speed is the distance traveled divided by the travel time. The average travel speed (feet/second) of vehicles on each link and network is provided by BICSIM.

In order to see the environmental impacts of various strategies, BICSIM provides the aggregate fuel consumption on each link as well as for the entire network. The values used by BICSIM are based on the fuel-consumption tables of the *Traffic Engineering Handbook*. These tables allow the calculation of fuel consumption rates for passenger cars and for two-axle six-tire trucks, for an idle engine, uniform speed (affected by gradient), and for stop and slowdown cycles.

One of the main factors when evaluating the bicycle-friendliness of facilities is their safety. Because in BICSIM all the vehicles behave rationally and obey traffic rules (with the exception of bicycle STOP sign behavior), it is impossible for the model to estimate the number of accidents on the network and their severity. It is however possible to summarize the number of situations where, in case of unsafe behavior, accidents could occur. The safety measures included in BICSIM count the number of cars encountered (for bikes) and number of bikes encountered (for cars), which gives the chance of confrontation between motorized and non-motorized traffic. Most of bicycle and motor vehicle accidents occur at intersections, or more precisely, when the paths of these two types of vehicles cross. BICSIM thus focuses on "lateral" is encounters. Whenever a motor vehicle (bicycle) must slow down, stop, or remain stopped in order to yield to a bicycle (motor vehicle) at an intersection, a counter called bikesmet (carsmet) is incremented. When a motor vehicle (bicycle) can not change lanes due to an insufficient gap caused by a bicycle (motor vehicle), a counter called bikescrossed (carscrossed) is incremented. This variable also includes right-turning motor vehicles obstructed by bicycles on the adjacent bike lane. These counters exist for each link, and at the end are summed for the whole network. These Measures of Effectiveness provide information on the number of potentially dangerous encounters, when the disrespect towards the other mode could lead to an accident.

The primary function of including pedestrians, buses and parking activity into BICSIM is to consider their effect on the performance of motor vehicle and bicycle traffic. Measures of Effectiveness for these components are not generated.

The BICSIM of the present invention is the first in the world that takes into consideration bicycles when modeling urban traffic. In order to be able to test this model, extensive data collection was conducted, which is the subject of the next sections.

M. Location of Data Collection

The data used to test BICSIM were collected in Newark, a city with a population of around 25,000 people in Northern Delaware. Delaware is the leading state of the Northeast in its reliance on the automobile. Between 1980 and 1990 the number of registered motor vehicles increased three times faster than the population. The number of vehicle miles traveled each year increased 4.5 times faster than the population. Ninety-four percent of Delaware's citizens who are old enough to drive have driver's licenses. These numbers are higher than the national average, what is partly caused by Delaware's rural character, the current development patterns, and the increasing service-sector employment. The number of people commuting by bike is relatively small, and has declined by 17 percent between 1980 and 1990. In 1990 the statewide modal share of commuting by bikes was 0.3 percent, while in 1980 this number was 0.5 percent.

The state of Delaware has various bicycle facilities. The Delaware Department of Transportation (DelDOT) maintains one bike-path near Newark, and municipalities, state parks, and local parks maintain several other bike paths. DelDOT does not maintain any bike trails (paths with unimproved surface), but state and county parks have several of them. Delaware has ten green-ways which can be potentially used by bicyclists. In 1996 there were 1196.13 miles of paved shoulders in Delaware, and 12 official bike-lanes, 8 of which were in Newark. The state has eight officially designated bike routes. DelDOT has installed high-security bike racks at four part-and-ride lots, and they are planning to install them at six more locations. Some employers provide bike racks as well. There is currently no official policy on carrying bikes onto buses, but it is generally expected that a bike will be collapsible in order to carry it easily to the bus. SEPTA also allows collapsible bicycles on its commuter trains at all times, and special permits allow passengers to carry conventional bicycles on the trains during off-peak periods.

The number of motor vehicle—bicycle crashes in Delaware peaked in 1993, and has since slightly declined. Still, in 1994 Delaware had the second highest bicycle fatality rate per population in the United States, and the number of bicycle fatalities as a percentage of the total traffic fatalities (4.5 percent) was the highest in the nation. In 1995 there were 192 motor vehicle crashes involving bicycles in Delaware, one of them was fatal. Most motor vehicle—bicycle rashes in this state involve younger age groups, usually teenagers.

Despite these discouraging numbers Delaware is not an exception from the nationwide trend, which recognizes the significance of bicycle transportation. Its Statewide Long-Range Transportation Plan considers the accommodation of alternative modes an important issue, in order to improve air quality and to help relieve congestion. The same plan states that bicycle access in Delaware has been discouraged by both development patterns and highway design practices. The plan also gives priority to bicycle and pedestrian projects that provide direct access to other modes, such as transit, where direct access for bicycling is considered 2 miles, and to provide bicycle facilities on roadway shoulders as much as possible. By 2020 they plan that priority areas will be established for bicycle facilities. These facilities will provide links to transit and ridesharing points. Local access to neighborhoods and other activity centers will permit bicycling, and adequate bicycling facilities will be built to accommodate the growing use of bicycles for recreation.

Bicycles are treated as vehicles in the state. According to Delaware bicycle laws "Every person riding a bicycle shall have all the rights and responsibilities of a driver of any other vehicle." On the other hand, "person riding a bicycle on a sidewalk, or pushing a bicycle across the road at a crosswalk shall have the rights and responsibilities of a pedestrian." The same law requires bicycles to be ridden 'as close as practicable' to the right-hand edge of the roadway except when passing another bicycle or vehicle going in the same direction, making a left-hand turn, or avoiding parked or moving vehicles, fixed or moving objects, animals, surface hazards, etc. Bicyclists may ride near the left-hand edge of the roadway only on one-way highways with two or more lanes and less than 30 mph speed limit. Riding more than two abreast is prohibited, and for two is permitted only within a single lane and when not impeding the normal and reasonable movement of roadway traffic. Left turns are permitted according to the normal motor vehicle type of left turn procedure or special traffic control devices. Another permitted way of turning left is by approaching the turn on the right edge of the roadway, crossing the intersecting roadway, stopping out of the way of traffic, yielding to all vehicles and pedestrians, obeying all traffic control devices and then proceeding in new direction. The law also requires every bicycle to be capable of stopping within 25 feet from a speed of 10 mph on dry, clean, level pavement. Last year one of the widely discussed laws was Delaware's bicycle helmet law, which requires that all persons under the age of 16 must wear a properly fitted and fastened bicycle helmet when riding a bicycle on a public property. If a child is not wearing a helmet parents are fined with up to $50.

N. Newark Bicycling Situation

The bicycling situation in Newark is very different from that in other parts of Delaware. This difference is attributed mainly to the presence of the University of Delaware, and a compact development pattern in the city. It is estimated that 7 percent of all trips in Newark are with bicycles.

According to the Newark Area Bicycle Interim Report the city of Newark provides a variety of bicycle facilities, including bike lanes, paths, routes and shared roadways, but their current design and designation creates confusion, and inappropriate and unsafe behavior. The predominant facilities are shoulders and shared use roadways. The signs and markings on pavements and shoulders are inadequate and inconsistent. The widths of bicycle lanes are also inadequate and inconsistent, and parking conflicts impede bicycle travel. The shoulders and bicycle lanes are often impossible or dangerous to use because of the presence of debris and/or vegetation.

The same study evaluates the situation at the University of Delaware campus. They conclude that the crosswalks here provide minimal safety for bicyclists and their holding areas are of inadequate size. The "Mall" area is wide, and accommodates two-way bicycle and pedestrian traffic without directional signs. Because of the high number of paths in this area and their widths and majority of pedestrian bicycle conflicts can be avoided. Still, intersections of multiple pedestrian/bicycle paths, where most of the conflicts occur, lack directional signs or other design features to indicate proper movement.

The number of bicycle parking spaces is inadequate in a number of locations. There are 653 bicycle rack spaces on Laird Campus, 949 on Central Campus, 754 on East Campus, 1,086 on West Campus, and 134 on South Campus. At locations where the number of spaces is insufficient, cyclists often use fences and other posts for securing bikes. Locking the bicycles to stairway railings or handicap ramps is prohibited, and these bikes are removed at the owner's expense. At most residence halls bicycle storage areas are provided, or students are permitted to keep their bikes in their residence hall rooms. The main consequence of the insufficient number of bicycle racks is bicycle theft. Last school year there were more than $50,000 work of bicycles stolen from students, staff, and faculty. In order to help return the recovered bikes to the owners, the Crime Prevention Unit of the University of Delaware Public Safety established a Bicycle Registration program. Another big problem is the high number of bicyclist accidents in the town.

O. Bicycle Accidents and Safety in Newark

When asked what the biggest transportation problem on campus was, Doug Tuttle, Head of the University of Delaware Public Safety, replied bicyclists. In his opinion bicyclists impose a potential hazard to themselves and others, because they very often do not obey the traffic rules. Mr. Tuttle feels that this behavior increases the probability of collisions between bicyclists and pedestrians, and bicyclists and motor vehicles. Another possible factor is that more than half of the students are the University are from out-of-state and are not familiar with the local streets and state laws.

According to Lt. Alex von Koch, of the Newark Police, in 1995 there were 56 accidents involving bicycles in the city. As of October 1996, bicycles were involved in 23 collisions for the year. In September of 1996 alone, there were seven bicycle accidents in Newark. The real numbers are probably even higher, because the majority of bicycle accidents are never reported. The main causes of these accidents were motor vehicles failing to yield to bikes (2 incidents), bicyclists riding on wrong side of the road being struck by a motor vehicle (3 incidents), exiting vehicle hitting bicycle proceeding in wrong direction (2 incident) and bike failing to stop for red light struck by a motor vehicle (1 incident).

There are several groups on the University of Delaware campus, and in Newark, which have been meeting this year to determine ways to promote bicycle safety. The Professional Advisory Council (PAC) of the University has been discussing the possibility of forming a Bicycle Safety Committee since July 1996. The group is planning to create a bicycle safety video to be shown on Student Life TV and distributing a 'first aid kit' for incoming students to address a variety of safety issues. The university's Public Safety provides brochures on this topic at information tables at the New Student Orientation to incoming students. Another group which has been discussing bicycle safety is the Western Newark Traffic Relief Committee. They would like to conduct a bicyclist and pedestrian campaign to help make students aware of the potential hazards.

P. Evaluation of Bicycle Facilities in Newark

A bicycle traffic count study conducted as part of the aforementioned Newark Area Bicycle Interim Report shows that the most significant numbers of cyclists were counted near the main campus at the intersections of Delaware and South College Avenue, Delaware Avenue and Chapel Street, and Main Street and Chapel Street. Based on this publication and on personal observation and experience of the author of this thesis we provide a summary of bicycling situations on some of these heavily traveled roads.

Delaware Avenue is a one-way road, which is shared by many modes of transportation, including bicycles. There are two crosswalks at the Mall that have virtually no protection for pedestrians and bicycles wishing to cross. According to some ways to improve this situation for bicyclists would be to repaint the bike lanes, force bicyclists to travel with the traffic, and put up better signs in the Mall area.

On Elkton Road the shoulder is not side enough for a road with such heavy bicycle and motor vehicular volume, and vehicle speed. This shoulder is usually full of debris and suddenly ends at intersections where the right turn lane starts. A good example for this is the intersection of Elkton Road and apple Road. After this intersection the shoulders are wide enough for biking, but are frequently interrupted by signalized intersections. The pavement is often cracked, and at one location the joints of a small bridge create hazard for the bicyclist. The pedestrian crosswalks on Elkton Road have raised medians. This means that bicyclists must leave the crosswalk to cross the road (even when walking their bikes). The signing on this road is also inconsistent. Some solutions that may improve the situation would include better signs, provision of a through bike lane to the left of the right turn lane, and reduction in the number of access points.

Main Street is another one-way street, but for bicyclists it is even worse than Delaware Avenue, because of the on-street parking. Bicycling is prohibited on the sidewalks, so bikers are forced to travel with the traffic. Also, bicyclists face many 'non-friendly' drain grates, many access points and many signalized intersections. Some possible solutions to these problems are to restrict parking to one side of the street to allow for bike lanes on the other side, replace grates with bicycle compatible ones, place bike racks near key locations, provide for through bike movement at intersections and enforce the restriction of bikes on the sidewalks. However, Main Street does not need a bike lane, and to talk about removing parking is unfeasible.

Cleveland Avenue is also used by many students of the University. Some of the problems with this road include: 'non-friendly" drain grates, debris collection along roadway curbing, many access points and signalized intersections, narrow lanes, and on-street parking in some areas. Some suggested improvements are to replace the drain grates with bicycle compatible ones, provide routine maintenance including sweeping, and remove on-street parking to widen lanes to provide room for bicycles.

Academy Street, which runs past Perkins Students Center, is another roadway with heavy bicycle traffic. There is minimal protection at the student center crossing, debris along pavement edge and wide pavement with faded line delineation striping. Side street parking beginning near Pearson Hall interrupts the bicycle route. Some potential improvements are to provide routine maintenance and sweeping, provide better bike route signing and marking, and to provide better signing/signalization particularly at the student center crossing.

Many students also live on or near Chapel Street. This is a wide roadway except between Cleveland and Delaware Avenue. There is minimal to no bike route signing and/or striping, the drain grates are not on the same level as the roadway and there is narrow clearance at the railroad bridge just south of Cleveland Avenue. Some suggested improvements are to restrict on-street parking to one side to accommodate bike lanes, provide a bike lane through the railroad underpass, provide better signing, and to repave grate areas to make them consistent with the roadway.

South College Avenue is one of the busiest corridors through campus. Some of the problems for bicyclists on this roadway include on-street parking, signs facing the same direction on both sides encouraging wrong way riding, improper usage of connections over the Northeast Corridor rail tracks, shoulder area lost for right-turn lanes, 'non-friendly' drain grates, and frequent access points and signalized intersections. There are bike lanes in certain parts of this road, but they are not continuous. Also the number of bike route signs seems quite excessive in some sections. Some potential solutions are to provide better bike route signing, provide routine maintenance and sweeping, either widen and extend the current paved lane or provide markings on shoulders, provide bike friendly drain grates, and widen narrow lanes to provide room for bicycles.

The bridge on Rt. 896 connection Main Campus and South Campus has wide enough bike lanes on both sides but the majority of the bicyclists use the sidewalk (which is prohibited). When traveling from main Campus, bikers must cross to the other side to use the sidewalk because there is no sidewalk on the right side of the bridge. Some of the grates on the bridge are below surface level and the joints of the bridge are not even with the pavement. Some possible solutions to these problems include a bicycle friendly crossing after the bridge so students can cross from the right side to the University buildings on the left side, and pavement-level drain grates and bridge joints.

North College Avenue is traveled frequently by students who live in the Christiana Towers, and on Ray Street (it links Laird Campus with Central Campus). This is a relatively slow moving roadway, which has two-way traffic and approximately 7 parking spaces. There is no designate bicycle facility, it crosses an active railroad line, there is some debris on the shoulders, and the drain grates are below grade. The railroad liens, which cross North College Avenue are at a slight angle which makes it harder for bicyclists to cross. Also, there are big gaps between the rail and rail bed which bicyclists could catch their tires on. Some recommendations for these problems are to reduce travel lanes and install signs/pavement markers, provide for improved through movement of bicycles at intersections with Cleveland Avenue and Main Street, and retain parking and existing wide curb lanes from Cleveland Avenue to Pomeroy Branch. The railroad crossing could be improved by filling in the gaps.

Papermill Road, which runs from Cleveland Avenue towards the Apartments at Pinebrook complex, has shoulders, which become narrow. There are numerous access points and the right turn lanes enter into the bike lanes. The bicycle lane signs and pavement markings are substandard and the drain grates are not safe. Some possible recommendations for this roadway are to install signs and pavement markings, provide better maintenance and sweeping programs, provide for through movement of bicycles to the left of vehicle right turn lanes, and replace non-safe drain grates.

Amstel Avenue, which begins on Elkton road near the Rodney Underpass and ends at South College Avenue near the Smith Overpass, is traveled by many students from West Campus. Vehicular left turns are prohibited from northbound South College Avenue onto Amstel Avenue. There are about 46 parking spaces on this roadway and the existing bicycle lane is on one side only (opposite parking). The main problem is that this lane is on the right side for one block, and along the second block it is on the left side. The pavement is rough, broken, and even buckled in some places and there is quite a bit of debris. Again, the drain grates are not safe. Some of the recommendations for this street are to remove on-street parking, install signs and pavement markings to accommodate bicycle lanes.

In our opinion, one of the biggest problem spots is the crossing from Rodney Underpass to Amstel Avenue on Elkton Road. Basically all of the bicyclists use the pedestrian crossing to cross Elkton Road. However, to get there, when coming from Main Campus, they have to get to the left side (the bike lane is on the right side) and cross to the sidewalk first. By waiting for crossing, they take a large space away from the pedestrians. In the middle of the crosswalk, there is a raised median with a small passageway that is level with the roadway. However, this is hardly enough for one bike, and it is almost impossible to fit two bikes through at one time. If a bicycle stays in the center while crossing, it could create a potentially dangerous situation, because the bicycle would be protruding into the traffic lanes and could be easily struck by a car. Another disadvantage is that the lights are operated by push buttons, which are located in an inconvenient location for bicyclists. Some of the possible solutions would be to have a few feet long left turning bicycle lane from Amstel Avenue to Elkton Road, from which the bicyclist could turn right to the dormitories. In this case, the motor vehicle drivers would have to be alerted by proper signing. But this would solve the problem only in one direction. If the use of the crosswalk by bicyclists would be a more desirable option the push buttons should be located so that bicyclists can reach them. Both the sidewalk, which provides the waiting area for the crossing, and the passageway in the median should be widened.

The underpass connecting Rodney Hall with the Main Campus is heavily used by both pedestrians and bicyclists. Despite the fact that it was designed only for pedestrians, this facility provides the only access to the dormitory's bicycle parking lot. Students are only allowed to walk their bikes under the underpass, which most people do not obey. This creates potentially hazardous situation, especially during the morning and afternoon peak periods. To provide additional width to the underpass would be a very costly solution. Thus, channelization should be used to separate bicyclists and pedestrians.

Another location heavily used by bicyclists is the Mall. It is quite obvious from its design that it was not intended to be used by bicycles. The pavement is not appropriate for biking, and the Mall and the Library are connected only by stairs and ramps for the disabled (their use by bicycles is prohibited). Also the entrance to the Mall from South College Avenue is so narrow that during peak periods it is barely enough for pedestrians, creating the hazard of pedestrian—bicycle collision, mainly when exiting the Mall. The Mall itself does not provide a separation between bicycles, pedestrians, inline skaters, joggers and others using this facility. Some of the possible improvements would be channelization of the Mall for the different modes, widening the entrance from South Chapel Street, and different design of the ramp on the front of Hullihen Hall so that it could be safely used by bicyclists.

The locations for the data collection in this study were selected based on the aforementioned facts.

Q. Data Collection and Analysis

In order to obtain the input parameters for the model data were collected in Newark, Delaware. These parameters include motor vehicle hourly volumes and turning percentages, ratio of trucks, and bicycle volumes and turning percentages. The STOP sign behavior of bicyclists was also observed. Pedestrian crossing volumes, number and duration of parking maneuvers, bus arrivals and dwell time, geometry and channelization and signal timing are all inputs for the model. On multi-use paths the bicycle and pedestrian volumes and turning percentages are entered into the program.

1. Network Definition

The first step of our analysis was to determine the geographical area to be covered in the study. This process was influenced by the facts published in the literature as well as by personal bicycling experience in the city. The locations selected were at the center of the University of Delaware campus in order to ensure the presence of various bicycle facilities, and high bicycle and motor vehicle volumes. The intersections included were Amstel Avenue and Elkton Road, Amstel Avenue and Orchard Road, Amstel Avenue and South College Avenue, South College Avenue and Delaware Avenue, Delaware Avenue and Academy Street, Academy Street and Main Street, and Main Street and College Avenue (both North and South). The multi-use path considered in the study was the Mall located on the main campus. Four mid-block pedestrian crossings were included in the data. They are the two crossing on Delaware Avenue between South College Avenue and Academy Street, and two crossings on Main Street on the same section. The graphical representation of this network is shown on FIG. 11.

2. Data Collection Process

The data were collected in several stages. The most extensive effort involved the collection of vehicular volumes and turning percentages. During this phase pedestrian volumes and the number of parking maneuvers were also obtained, as well as the percentage of stopped vehicles. The stop sign behavior of bicyclists was also observed. This phase is described in section 3 below.

In the next phase, data describing network geometry (lanes and channelization), location of bus stops and parking zones, and signal control were obtained. Lengths of parking maneuvers were observed and information on bus lines using the network was collected. This process is summarized in section 4.

3. Main Field Data Collection Effort

During the first phase of data collection vehicular volumes, turning percentages, percentage of stopped vehicles, STOP sign behavior of bicyclists, number of parking maneuvers, and pedestrian volumes were observed.

As described above twelve locations were selected, including seven intersections, one multi-use path, and four mid-block crossings to collect the data. Based on the configuration of the intersections the collection sheets were prepared. Using customized sheets for each location made it easier to collect the data in the field. Tally sheets were used for manual recording, each observed object was recorded with a mark on the prepared form. The locations were first reviewed and the best place for collection was selected based on visibility and comfort criteria. The collection teams consisted of one or two people, depending on the volume and geometry of the intersection, with the duties being divided between the team members variously. This process was based on the advice offered by the *Manual of Transportation Engineering Studies.*

The selection of time periods is another important task when collecting field data. Perhaps the most important distinctive feature of campus travel is that the regular class breaks cause regular peaks throughout the day. A study conducted in the University of Illinois campus at Urbana-Champaign during the late seventies shows that peak traffic volumes generally increased during the morning hours to a lunch-time high, and decreased afternoon with another substantial peak around 5:00 PM. However, bicycle use did not exhibit the same sharp peaks during class breaks as pedestrian traffic.

According to the *Manual of Transportation Engineering Studies*, typical count periods for turning movements, sample counts, vehicle classifications, and pedestrians include: 2 hours at peak period, or 4 hours at morning and afternoon peak periods, or 6 hours at morning, midday, and afternoon peak periods, or 12 hours during daytime. For the purpose of this study 6 hours per day counting was chosen, in order to capture the peaks in all included modes. To capture the highest motor vehicle, bicycle, and pedestrian volumes the collection periods were selected based on class schedules and the usual work related peak hours. The resulting time periods were at morning from 7:30 to 9:30 am, at noon from 11:30 a.m. to 1:30 p.m., and during the afternoon from 4:30 too 6:30 p.m. Count intervals are typically 5 or 15 minutes. For the purpose of this study the data were collected at 15-minute intervals. Because practical applications often require less than 10 hours of data at any given location, and data collected in Newark served as input parameters for testing rather than to obtain a solution to Newark's bicycle problem, 6 hours per location were selected as a sufficient time length. One might argue that for a more detailed study longer time periods should be used, although to our knowledge, our count is the most extensive bicycle count ever conducted in Newark or at the University of Delaware campus.

In order to capture the highest bicyclist volumes, the collection was conducted in late may. This period was selected because it ensured the highest probability of warm weather during the semester, and thus the highest bicycle volumes.

After collection, the raw data was converted into suitable form for analysis, by converting tally marks to numbers, and summarizing them into tables. They contain the volumes and turning percentages of bicycles and motor vehicles, the percentage of stopped motor vehicles, and the percentage of trucks from all motor vehicles. These tables also contain the pedestrian crossing volumes at intersections and mid-block crossings, as well as the pedestrian volumes and turning percentages at the Mall.

Another goal of this data collection was to observe the stop sign behavior of bicyclists. We found out that NO bicyclist stopped at a stop sign, unless forced by other vehicles, what seems to support the facts published in the literature, as well as our personal experience. This had a major effect on the logic of the BICSIM algorithm, as it was already described in the previous chapter.

4. Additional Data Collection

In order to properly model the environment in which the vehicles operate additional information is required. The second phase of data collection was aimed at obtaining these data. They include network geometry, signals and sign, buses, and parking activity characteristics.

Because we were unable to obtain any proper documentation of this road network, its characteristics were collected annually. The lengths and widths of each link were measured. The location of bus stops, pedestrian crossings and parking zones was determined. The number of parking spots was counted and the width of pedestrian crossings was measured as well. The channelization of each lane was graphically documented. The so-called "no-lane-change-distance" parameter of the model was obtained as the length of the solid line between the lanes prior to the intersection. Grades were not obtained and for the purpose of this study they were assumed to be zero.

The signal data were also collected manually. At each signalized intersection and pedestrian crossing the duration and sequence of phases was obtained. The signal indications during these phases were coded as described in the previous chapter.

Parking maneuvers can delay the vehicles traveling in the rightmost (in case of one-way streets also leftmost) lane. An average length of these maneuvers used in the model was obtained by recording the length of parking maneuvers during a field data collection. Because this information served only as an approximate value with no significant impact, the same value was used for each parking zone. The duration of parking maneuvers was collected on Main Street during the noon peak hour, what assured high occurrence of maneuvers. The values obtained are presented in Table 3. An interesting observation is that the average lengths of maneuvers for both parking and leaving vehicles are very similar.

As it was explained in the previous chapter the arrival of buses is not random, but is governed by their schedule. There are two types of buses using the modeled network, these are the DART and the University of Delaware buses. Their schedules were used to obtain the bus lines entering the network at each entry node, their headways, the arrival time of the first bus (relative to the start of simulation), and the links these buses were traveling on. Since it was assumed that every bus stops at each bus stop and their dwell times are the same, there was no effort made to obtain this information. The summary of bus schedule information is provided in Table 4.

R. Introduction to Model Testing Verification and Validation

The degree to which the model accurately represents the real system can be determined in two stages, verification and validation. Verification (also called debugging) is determining that a simulation computer program performs as intended, that the conceptual simulation model (flowcharts, assumptions) is correctly translated into a working program. Validation is determining whether the conceptual simulation model is an accurate representation of the system.

There are a number of principles helping with the debugging process. The program should be written and debugged in modules or subprograms. It should be read by more than one person in order to avoid logical mistakes. This type of debugging is also called "structured walk-through". The simulation should be run under a variety of settings of input parameters and checked whether the output is reasonable. One of the most powerful techniques is "trace". The state of the simulated system is printed out after each event occurs and compared with hand calculations. It is desirable to evaluate each possible program path and the program's ability to deal with 'extreme' conditions. The model should be run under simplifying assumptions for which its true characteristics are known or can be easily computed. The sample mean and variance for each simulation input probability distribution should be compared with the desired (historical) mean and variance. When debugging it may also be helpful to observe the animation of the output. Use of a simulation package makes debugging much easier.

Validation is a procedure to check whether the simulation model reasonably approximates the real system, whether there is an adequate agreement between the model and the system being modeled. An absolutely valid simulation model does not exist. The idealistic goal of validation is a simulation model good enough to be used to make decisions about the system similar to those that would be made by experimenting with the system itself. The degree of difficulty of the validation process depends on the complexity of the system, and on whether a version of the system currently exists. In case of a complex system the model can be only an approximation to it. Simulation models are always developed for a particular set of purposes, thus a model that is valid for one purpose may be valid for another. The model should be validated relative to those Measures of Effectiveness that will actually be used for decision making. Other MOE may not be important.

It is usually impossible to perform a formal statistical validation between model out put data and real system output data (if it exists), due to their nature. But some principles should be followed to ensure validity of the model. One of the basic principles is that all model assumptions should be written down during the process of creating the program, not at once at the end.

Under a conventional three-step approach to develop valid simulation models, the objective during the first step is to develop a model with high face validity, i.e., a model that seems reasonable to people knowledgeable about the system under study. This is achieved by discussing the problem with experts, observations of the system (data collection), being familiar with the existing theory and relevant results from similar simulation models, and by using own experience and intuition.

The goal of the second step is to test quantitatively the assumptions made during model development. If theoretical probability distributions were used as input, the adequacy of their fit can be assessed by graphical plots and goodness-of-fit tests. Sensitivity analysis can be used to determine to which parameters of the model is the output most sensitive, and these aspects should be modeled most carefully.

The goal of the third step is to establish whether the output data closely resemble the output data that would be expected from the actual system. If a system similar to the proposed one currently exists, than a simulation model of this existing system is developed. The outputs of this model are compared to the outputs of this existing system, and if they compare favorably, than the model of this existing system is considered to be valid. The model is then modified to represent the proposed system. The greater the commonality between the existing and proposed system, the greater is our confidence in the model of the proposed system. However, there is not always an existing system that can be used for this comparison.

The comparison of simulation output data and real-world observations is complicated by the facts that the output processes of the systems and models are usually non-stationary (the distributions of the successive observations change over time) and autocorrelated (the observations in the process are correlated with each other). Because of this classical statistical tests based on iid observations are not directly application.

One of the non-statistical procedures commonly used to validate simulation models is the Turing test. Experts are presented with the outputs of the system and the results of the model, and if they can differentiate between them, their explanation of how they did it is used to improve the model. If there is no existing system similar to the modeled one, it is still good to have the outputs reviewed by experts, whether the numbers obtained are reasonable.

The most commonly used approach for validation by simulation practitioners is the inspection approach. This approach involves the computation of one or more statistics from the real-world observations and corresponding statistics from the model outputs, and to compare them without the use of any fonnal statistical procedure. These statistics can be the sample mean, the sample variance, the same correlation function, and histograms. The danger in using this method is, that each of these statistics is essentially a sample of size one from some underlying population, making this method vulnerable to randomness of observations from both data sets. The inspection approach can provide valuable insight into the adequacy of the simulation models, but extreme care must be used in interpreting the results of this approach. If the two data sets compare favorable, the model can be considered "valid". If the model is not valid, but the validation procedure shows how to improve it, these changes should be made, and the simulation rerun. If these changes are made somewhat without justification until the two data sets agree, this procedure is called calibration.

There is no systematic common approach developed to validate microscopic traffic simulation models. After debugging the program the logic of different components, such as car following and lane changing, should be carefully reviewed. The acceleration and deceleration patterns, velocity pattern changes, trajectory plots, and headways obtained from the simulation should be examined. The sensitivity of these parameters to changes in the input variables should be studied.

S. Testing of BICSIM Model

As it was described above developing a valid microscopic traffic simulation program is extremely difficult. This section summarizes the efforts that were made to ensure the functionality and validity of BICSIM.

One of the basic principles of writing an easily verifiable program is to divide the code into logical components. The C++ programming language allows the program to be written in form of functions and function calls, and we fully utilized this feature during the development of BICSIM. This structure provides a good basis for debugging, since it is relatively easy to follow the change of value of a particular variable when passed among functions. This allows us to determine the location of the problem more easily.

The modular structure of the program helped to ensure higher validity of the final product. One of the basic principles of developing a valid simulation model, the recording of the assumptions during the development process, was also followed.

The debugging features of the C++ Builder compiler were used to help in the process of debugging. Because of the stochastic nature of the model this process was lengthy and quite complex. The data used for the testing were collected in the University of Delaware campus, in Newark, Delaware. In order to obtain the highest bicycle volumes for the model, the "bicycling-peak-hour" was selected as the time period used for testing. FIGS. 12–20 show the variations of bicycle volumes at each considered location. The hourly bicycle volumes were computed for each possible one-hour period during the collected time at each location and for the whole network. Without any doubt the highest bicycle volume on the network was present during the time 12:00 to 13:00 p.m., and this corresponds to the peak at most individual locations as well. The data collected during the noon hour were thus used to test the model.

During the debugging process a file called "debug.dat" was used to store the debugging information printed out at various instances. A number of variables were introduced to distinguish various levels of debugging, in order to save computational time, memory, and to make it easier to locate the bugs. Since randomness makes it extremely difficult to debug a simulation model, the same seed was during this process, unless multiple runs were necessary to obtain the necessary information.

During the first phase of model testing the focus was on the proper reading and assignment of input data. The data read-in from the input text files were printed out, and for every single entry it was checked whether its value corresponds to the value in the input file. This process is very time consuming but is crucial to the proper functioning of the model. In the second phase the output calculation and writing was debugged. It is very important to ensure that these two components of the model function well, since the testing of the main algorithm depends on getting the right information into and out of the program.

In order to validate cad calibrate the correct input to the model the random vehicle entry volumes were compared to field data. As it is described above, negative exponential distribution was used to model the arrival of vehicles. In case of motor vehicles a shift of 0.5 seconds was used to account for the minimum headway between consecutive vehicles. FIGS. 21 and 22 show the correspondence between the real-world and BICSIM 10-minute volumes. As it can be seen, in case of volumes less than 100 the numbers produced by BICSIM closely resemble the real world volumes. However, in case of motor vehicle volumes higher than 100 the negative exponential distribution with a shift of 0.5 seconds underestimated the entry volumes by approximately 10 percent. In order to calibrate the model the shift was reduced to 0.45 seconds for motor vehicle volumes higher than 100 per 10 minutes. Since this reduction did not produce the desired increase in motor vehicle volumes (FIG. 23), the shift was further decreased to 0.4 seconds (FIG. 24) and 0.3 seconds (FIG. 25) for motor vehicle volumes 100 and more per 10 minutes. The shift of 0.3 seconds proved to provide the best fit with real world entry volumes, although it slightly overestimates the number of motor vehicles.

The modules of the program were tested separately by printing out the variable values into text files ("trace" technique). It was checked whether these values are reasonable. The entry and arrival functions for motor vehicles, bicycles and buses were tested this way. The change of signal indications, the arrival of pedestrians on both crossings and paths and the scanning of parking maneuvers was also followed. The modules of vehicle scanning were also tested this way. Their speed, acceleration/deceleration, and position was traced after each function call, and the lane changing and turning maneuvers were closely followed. During this process a logical error was discovered in the way the vehicles changing lanes and links were scanned, and this part of the code was reworked.

The resulting outputs of several runs were inspected to determine whether they are reasonable. The fuel consumption values were compared to published values in order to ensure that they are reasonable.

It will be apparent to those skilled in the art that various modifications and variations can be made in the system and method of the present invention and in construction of the system and method without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method that simulates the movement of motor vehicle, and bicycle traffic in an environment, the method comprising:

- scanning all traffic signals in the environment over a predetermined time interval;
- updating parking activity, and motor vehicle and bicycle movement in the environment;
- checking whether any parking activity was generated for the predetermined time period; and
- simulating motor vehicle and bicycle movement in the environment using predetermined acceleration and deceleration rates, a motor vehicle and bicycle following model, and a lane changing model.

2. A computer-implemented method as recited in claim 1, further comprising:

- updating pedestrian movement in the environment; and
- simulating pedestrian movement in the environment.

3. A computer-implemented method as recited in claim 2, further comprising:

- scanning parking activity, pedestrian movement, and motor vehicle and bicycle movement in the environment prior to updating parking activity, pedestrian movement, and motor vehicle and bicycle movement in the environment.

4. A computer-implemented method as recited in claim 2, further comprising:

- reacting to a situation selected from the group consisting of pedestrians on crossings, parked motor vehicles, bus stops, and traffic signals or signs.

5. A system for simulating the movement of motor vehicle and bicycle traffic in an environment, the system comprising:

- a memory configured to store instructions; and
- a processor configured to execute instructions for:
  - scanning all traffic signals in the environment over a predetermined time interval,
  - updating parking activity, and motor vehicle and bicycle movement in the environment,
  - checking whether any parking activity was generated for the predetermined time period, and
  - simulating motor vehicle and bicycle movement in the environment using predetermined acceleration and deceleration rates, a motor vehicle and bicycle following model, and a lane changing model.

6. A system as recited in claim 5, wherein the processor is configured to execute the further instructions for:

- updating pedestrian movement in the environment; and simulating pedestrian movement in the environment.

7. A system as recited in claim 6, wherein the processor is configured to execute the further instructions for:

scanning parking activity, pedestrian movement, and motor vehicle and bicycle movement in the environment prior to updating parking activity, pedestrian movement, and motor vehicle and bicycle movement in the environment.

8. A system as recited in claim 6, wherein the processor is configured to execute the further instructions for:

reacting to a situation selected from the group consisting of pedestrians on crossings, parked motor vehicles, bus stops, and traffic signals or signs.

9. A computer readable medium that stores instructions executable by at least one processor to perform a method for simulating the movement of motor vehicle and bicycle traffic in an environment, comprising:

instructions for scanning all traffic signals in the environment over a predetermined time interval;

instructions for updating parking activity, and motor vehicle and bicycle movement in the environment;

instructions for checking whether any parking activity was generated for the predetermined time period; and instructions for simulating motor vehicle and bicycle movement in the environment using predetermined acceleration and deceleration rates, a motor vehicle and bicycle following model, and a lane changing model.

10. A computer readable medium as recited in claim 9, further comprising:

instructions for updating pedestrian movement in the environment; and instructions for simulating pedestrian movement in the environment.

11. A computer readable medium as recited in claim 10, further comprising:

instructions for scanning parking activity, pedestrian movement, and motor vehicle and bicycle movement in the environment prior to updating parking activity, pedestrian movement, and motor vehicle and bicycle movement in the environment.

12. A computer readable medium as recited in claim 9, further comprising:

instructions for reacting to a situation selected from the group consisting of pedestrians on crossings, parked motor vehicles, bus stops, and traffic signals or signs.

* * * * *

UNITED STATES PATENT AND TRADEMARK OFFICE

CERTIFICATE OF CORRECTION

PATENT NO. : 6,950,788 B2 
DATED : September 27, 2005
INVENTOR(S) : Ardeshir Faghri It is certified that error appears in the above-identified patent and that said Letters Patent is hereby corrected as shown below:

Title page,
Item [56], References Cited, OTHER PUBLICATIONS,
"Chang et al., G.-L. Simulating Network Traffic Flows with a massively Parallel Computing Architecture, Proceedings of the 2th Winter Simulation Conference, Dec. 1993, pp. 762-770" should read -- Chang et al., G.-L. Simulating Network Traffic Flows with a massively Parallel Computing Architecture, Proceedings of the 25th Winter Simulation Conference, Dec. 1993, pp. 762-770 --.
"Randhawa et al., S.U. A simulation-Based Analysis of Parking Systems Performance, Proceedings of the 25th Winter Simulation Conference, Dec. 1993, pp. 1231-1238" should read -- Randhawa et al., S.U. A Simulation-Based Analysis of Parking Systems Performance, Proceedings of the 25th Winter Simulation Conference, Dec. 1993, pp. 1231-1238 --.

Signed and Sealed this

Twenty-first Day of February, 2006

JON W. DUDAS
*Director of the United States Patent and Trademark Office*